(12) United States Patent
Mohammady et al.

(10) Patent No.: US 12,399,985 B2
(45) Date of Patent: Aug. 26, 2025

(54) DPOD: DIFFERENTIALLY PRIVATE OUTSOURCING OF ANOMALY DETECTION

(71) Applicant: Telefonaktiebolaget LM Ericsson (publ), Stockholm (SE)

(72) Inventors: Meisam Mohammady, Montreal (CA); Mengyuan Zhang, Hong Kong (CN); Yosr Jarraya, Montreal (CA); Makan Pourzandi, Montreal (CA); Han Wang, Chicago, IL (US); Yuan Hong, Saunderstown, RI (US); Lingyu Wang, Montreal (CA); Suryadipta Majumdar, Montreal (CA); Mourad Debbabi, Dollard des Ormeaux (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 257 days.

(21) Appl. No.: 18/005,761

(22) PCT Filed: Jul. 16, 2021

(86) PCT No.: PCT/IB2021/056462
§ 371 (c)(1),
(2) Date: Jan. 17, 2023

(87) PCT Pub. No.: WO2022/013838
PCT Pub. Date: Jan. 20, 2022

(65) Prior Publication Data
US 2023/0273994 A1    Aug. 31, 2023

Related U.S. Application Data

(60) Provisional application No. 63/053,231, filed on Jul. 17, 2020.

(51) Int. Cl.
*G06F 21/55* (2013.01)
*G06F 21/62* (2013.01)

(52) U.S. Cl.
CPC ........ *G06F 21/554* (2013.01); *G06F 21/6245* (2013.01); *G06F 2221/033* (2013.01)

(58) Field of Classification Search
CPC ............... G06F 21/554; G06F 21/6245; G06F 2221/033
(Continued)

(56) References Cited

U.S. PATENT DOCUMENTS

| 2010/0060350 A1* | 3/2010 | Zhang ................ H03H 11/1286 327/553 |
| 2011/0103673 A1* | 5/2011 | Rosenstengel ........ G06T 7/0012 382/132 |

(Continued)

FOREIGN PATENT DOCUMENTS

| EP | 3340101 A1 | 6/2018 |
| WO | 2017187207 A1 | 11/2017 |

OTHER PUBLICATIONS

Mohammady et al., DPOAD: Differentially Private Outsourcing of Anomaly Detection through Iterative Sensitivity Learning, arXiv: 2206.13046, pp. 1-13 (Jun. 2022) (Year: 2022).*

(Continued)

*Primary Examiner* — David P Zarka
(74) *Attorney, Agent, or Firm* — Weisberg I.P. Law, P.A.

(57) ABSTRACT

A method, system and apparatus are disclosed. According to one or more embodiments, a data node is provided. The data node includes processing circuitry configured to: receive an anomaly estimation for a first privatized dataset, the first private dataset being based on a dataset and a first noise profile, apply a second noise profile to the dataset to generate a second privatized dataset, the second noise profile being based at least on the anomaly estimation, and optionally cause transmission of the second privatized dataset for anomaly estimation.

40 Claims, 13 Drawing Sheets

(58) Field of Classification Search
USPC .......................................................... 726/23
See application file for complete search history.

(56) References Cited

U.S. PATENT DOCUMENTS

| | | | | |
|---|---|---|---|---|
| 2017/0316346 | A1* | 11/2017 | Park | G06N 20/00 |
| 2017/0353855 | A1 | 12/2017 | Joy | |
| 2018/0173894 | A1* | 6/2018 | Boehler | G06F 16/285 |
| 2018/0181878 | A1* | 6/2018 | Kasiviswanathan | |
| | | | | G06F 21/6245 |
| 2019/0026489 | A1* | 1/2019 | Nerurkar | G16H 10/60 |
| 2019/0372859 | A1* | 12/2019 | Mermoud | H04L 41/28 |
| 2020/0401726 | A1* | 12/2020 | Lim | H04L 9/0643 |
| 2022/0138316 | A1* | 5/2022 | Chen | G06F 21/554 |
| | | | | 726/23 |

OTHER PUBLICATIONS

Meisam Mohammady, Novel Approaches to Preserving Utility in Privacy Enhancing Technologies, Diss. Concordia University, pp. 114-152 (Sep. 2020) (Year: 2020).*

International Search Report and Written Opinion dated Oct. 18, 2021 issued in PCT Application No. PCT/IB2021/056462 filed Jul. 16, 2021, consisting of 18 pages.

Chowdhury et al., Crypte: Crypto-Assisted Differential Privacy on Untrusted Servers; Cornell University Library; Feb. 20, 2019, consisting of 24 pages.

Mohan et al., GUPT: Privacy Preserving Data Analysis Made Easy; Human Factors in Computing Systems, ACM Press/Addison-Wesley Publishing Co.; Scottsdale, AZ, May 20-24, 2012, consisting of 12 pages.

Okada et al., Differentially Private Analysis of Outliers; Graduate School of SIE, University of Tsukuba; Advances in Intelligent Data Analysis XIX; Springer International Publishing, Aug. 29, 2015, consisting of 22 pages.

Rattanavipanon et al., Releasing ARP Data with Differential Privacy Guarantees for LAN Anomaly Detection; 2021 18th International Conference on Electrical Engineering/Electronics, Computer, Telecommunications and Information Technology; IEEE, May 19, 2021, consisting of 5 pages.

Ukil et al., Privacy for IoT: Involuntary Privacy Enablement for Smart Energy Systems; 2015 IEEE International Conference on Communications (ICC), Jun. 8, 2015, consisting of 6 pages.

Bhaduri et al., Privacy-Preserving Outlier Detection Through Random Nonlinear Data Distortion, IEEE Transactions on Systems, MAN, and Cybernetics—Part B: Cybernetics; 2010, consisting of 13 pages.

Boggs et al., Cross-domain Collaborative Anomaly Detection: So Far Yet So Close, ResearchGate; Conference Paper—Sep. 2011, consisting of 21 pages.

Burkhart et al., The Role of Network Trace Anonymization Under Attack; ACM SIGCOMM Computer Communication Review; vol. 40, No. 1, Jan. 2010, consisting of 6 pages.

Burkhart et al., SEPIA: Privacy-Preserving Aggregation of Multi-Domain Network Events and Statistics; Proceedings of the 19th USENIX Conference on Security (Berkeley, CA, 2010), USENIX Security '10, USENIX Association, consisting of 17 pages.

Cheetancheri et al., A Distributed Host-based Worm Detection System; SIGCOMM '06 Workshops Sep. 11-15, 2006, Pisa, Italy; Copyright 2006 ACM, consisting of 7 pages.

Chen et al., Collaborative Detection of DDOS Attacks over Multiple Network Domains; IEEE Transactions on Parallel and Distributed Systems TPDS-0228-0806, Jan. 2008, consisting of 15 pages.

The Dung et al., A Distributed Solution for Privacy Preserving Outlier Detection; IEEE Computer Society; 2011 Third International Conference on Knowledge and Systems Engineering, consisting of 6 pages.

Dwork, Differential Privacy: A Survey of Results, Microsoft Research; Springer-Verlag Berlin, Heidelberg 2008, consisting of 19 pages.

Dwork et al., Calibrating Noise to Sensitivity in Private Data Analysis; Microsoft Research, Silicon Valley; Theory of Cryptography (Berlin, Heidelberg, 2006), Springer Berlin Heidelberg, consisting of 20 pages.

Erfani et al., Privacy-Preserving Collaborative Anomaly Detection for Participatory Sensing; Advances in Knowledge Discovery and Data Mining; Cham, Switzerland, 2014, Springer International Publishing, consisting of 13 pages.

Hong et al., Collaborative Search Log Sanitization: Toward Differential Privacy and Boosted Utility; IEEE Transactions on Dependable and Secure Computing, vol. 12, No. 5, Sep./Oct. 2015, consisting of 15 pages.

Jung et al., Fast Portscan Detection Using Sequential Hypothesis Testing; IEEE Symposium on Security and Privacy, 2004; Proceedings May 2004, consisting of 15 pages.

King et al., A Taxonomy and Adversarial Model for Attacks against Network Log Anonymization; Proceedings of the 2009 ACM Symposium on Applied Computing; New York, NY 2009, SAC '09, ACM, consisting of 8 pages.

Machiraju et al., Verifying Global Invariants in Multi-Provider Distributed Systems; Proc. 3rd Workshop on Hot Topics in Networks (HotNets-III), New York, NY: The Association for Computing Machinery, Inc., Nov. 2004 consisting of 6 pages.

McSherry et al., Differentially-Private Network Trace Analysis; Microsoft Research; SIGCOMM '10, Aug. 30-Sep. 3, 2010, New Delhi, India, consisting of 12 pages.

McSherry, Privacy Integrated Queries: An Extensible Platform for Privacy-Preserving Data Analysis; Communications of the ACM; ACM SIGMOD International Conference on Management of Data, New York, NY, Sep. 2010, vol. 53 No. 9, consisting of 9 pages.

Pang et al., The Devil and Packet Trace Anonymization; ACM SIGCOMM Computer Communication Review; vol. 36, No. 1, Jan. 2006, consisting of 10 pages.

Parekh et al., Privacy-Preserving Payload-Based Correlation for Accurate Malicious Traffic Detection; SIGCOMM '06 Workshops Sep. 11-15, 2006, Pisa, Italy, consisting of 8 pages.

Riboni et al., Obfuscation of Sensitive Data in Network Flows; Proceedings IEEE INFOCOM, Mar. 2012, consisting of 9 pages.

Simmross-Wattenberg et al., Anomaly Detection in Network Traffic Based on Statistical Inference and Alpha-Stable Modeling; ResearchGate; IEEE Transactions on Dependable and Secure Computing, vol. 8, No. 4, Jul./Aug. 2011, consisting of 17 pages.

Simpson et al., Neti@home: A Distributed Approach to Collecting End-to-End Network Performance Measurements; Passive and Active Network Measurement (Berlin, Heidelberg, 2004), consisting of 7 pages.

Bin Tariq et al., Detecting Network Neutrality Violations with Causal Inference; CoNEXT '09, Dec. 1-4, 2009, Rome, Italy, consisting of 12 pages.

Terrovitis et al., Privacy-preserving Anonymization of Set-valued Data; PVLDB '08, Aug. 23-28, 2008, Auckland, New Zealand, consisting of 11 pages.

Yegneswaran et al., Global Intrusion Detection in the DOMINO Overlay System; Proceedings of Network and Distributed System Security Symposium (NDSS (2004), consisting of 17 pages.

Goldstein et al., Histogram-based Outlier Score (HBOS): A fast Unsupervised Anomaly Detection Algorithm; Poster and Demo Track of the 35th German Conference on Artificial Intelligence (KI-2012), Sep. 24-27, 2012, consisting of 5 pages.

Asif et al., How to Accurately and Privately Identify Anomalies; CCS '19, London, United Kingdom; Association for Computing Machinery, Nov. 11-15, 2019, consisting of 18 pages.

Bittner et al., Using Noisy Binary Search for Differentially Private Anomaly Detection; International Symposium on Cyber Security Cryptography and Machine Learning; Springer International Publishing AG, 2018, consisting of 18 pages.

Asif et al., Collaborative Differentially Private Outlier Detection for Categorical Data; 2016 IEEE 2nd International Conference on Collaboration and Internet Computing, consisting of 10 pages.

Asif et al., Differentially Private Outlier Detection in a Collaborative Environment; International Journal of Cooperative Information Systems 27, No. 03; Sep. 2018, consisting of 44 pages.

(56) References Cited

OTHER PUBLICATIONS

Bohler et al., Privacy-Preserving Outlier Detection for Data Streams; Data and Applications Security and Privacy; Lecture Notes in Computer Science, vol. 10359; Springer, Cham, Switzerland; Jan. 15, 2018, consisting of 13 pages.

Okada et al., Differentially Private Analysis of Outliers; Machine Learning and Knowledge Discovery in Databases; .Lecture Notes in Computer Science, vol. 9285. Springer International Publishing, Cham, Switzerland; 2015, consisting of 16 pages.

Ding et al., Outsourcing Internet Security: Economic Analysis of Incentives for Managed Security Service Providers; International Workshop on Internet and Network Economics; Springer, Berlin, Heidelberg, 2005, consisting of 13 pages.

Thorp, Portfolio Choice and the Kelly Criterion; Stochastic optimization models in Finance; Business and Economics Statistics Section of Proceedings of the American Statistical Association; Aug. 13, 2016, consisting of 10 pages.

Rubinstein et al., Pain-Free Random Differential Privacy with Sensitivity Sampling; Proceedings of the 34th International Conference on Machine Learning, Sydney, Australia, Jun. 8, 2017, consisting of 12 pages.

Goldstein et al., Histogram-based Outlier Score (HBOS): A fast Unsupervised Anomaly Detection Algorithm; German Research Center for Artificial Intelligence (DFKI) Kaiserslautern; 2012, consisting of 1 page.

\* cited by examiner

```
INPUT: DATASET D, PRIVACY BUDGET ϵ
OUTPUT: SET OF IDENTIFIED ANOMALIES WHICH IS ϵ-DP
1   Δ_qo  ← GLOBAL SENSITIVITY (D)
2   i=0
3   WHILE ϵ > 0 DO
4       i=i+1
5       Δ_qE ← ESTIMATED SENSITIVITY (AN EXEMPLARY SOLUTION TO
6              ADDRESS THIS PROBLEM OF SENSITIVITY LEARNING BY
                USING AN APPROACH)
7
8       ϵ_0 ← FIND OPTIMAL BUDGET FOR OUTSOURCING OF NEXT ROUND
9              USING KELLY CRITERION
10      ϵ = ϵ - ϵ_0
11      H̃_i = M(D, ϵ_0, Δ_qO) APPROPRIATE DP MECHANISM M
        TO RELEASE PRIVATE DATA TYPE REQUIRED BY DATA ANALYST
        USING THE INPUT PARAMETERS, E.G., DP-HISTOGRAM
        MECHANISM

12      R = A(H̃_{1,2,...,i}): ANALYZING ALL PREVIOUS RECEIVED
        DATASETS TO OPTIMALLY IDENTIFY ANOMALOUS RECORDS
13      Δ_qo ← OUTSOURCING LEARNED SENSITIVITY FOR NEXT ROUND
14             USING ALL PREVIOUS ROUNDS OF ANALYSIS
15  END
16  RETURN R
```

FIG. 13

DPOD: DIFFERENTIALLY PRIVATE OUTSOURCING OF ANOMALY DETECTION

CROSS-REFERENCE TO RELATED APPLICATIONS

This application is a Submission Under 35 U.S.C. § 371 for U.S. National Stage Patent Application of International Application No.: PCT/IB2021/056462, filed Jul. 16, 2021 entitled "DPOD: DIFFERENTIALLY PRIVATE OUTSOURCING OF ANOMALY DETECTION," which claims priority to U.S. Provisional Application No. 63/053,231, filed Jul. 17, 2020, entitled "DPOD: DIFFERENTIALLY PRIVATE OUTSOURCING OF ANOMALY DETECTION," the entireties of both of which are incorporated herein by reference.

TECHNICAL FIELD

The present disclosure relates to wireless communications, and in particular, to differential privacy based anomaly detection.

BACKGROUND

There have been several studies on private conduction anomaly detection over one or several datasets (vertically or horizontally partitioned datasets), in a centralized setting, where a number of participants may want to build a global model from their local records, while none of the participants may be willing to disclose their private data. However, there is no practical solution to privately outsource the anomaly detection to third-party managed security service providers (MSSP). In computing, managed security service providers (MSSP) are security services that have been outsourced to a third-party service provider. The roots of MSSPs are in the Internet Service Providers (ISPs) in the mid to late 1990's. In particular, initially ISPs would sell customers a firewall appliance, as customer premises equipment (CPE), and for an additional fee would manage the customer-owned firewall over a dial-up connection. According to industry research, most organizations (74%) manage IT security in-house, but 82% of IT professionals said they have either already partnered with, or plan to partner with, a managed security service provider.

Two reasons explain the quick expansion of security outsourcing. First, it offers production cost advantages. For example, for security device (firewalls, IDSs) management, a security engineer may cost $8,000 to $16,000 per month. In order to provide 24*7 support, this cost needs to at least be tripled. For the same functions, MSSPs charge between $600 and $4,000 per month. For example, Counterpane, one of the most successful MSSPs, charges only 4% and 10% of cost a firm incurs to monitor network security. Second, security service providers have richer experiences, updated technology and better trained expertise by specializing in this area and serving diverse range of clients. A large client base also contributes to the improvement of the service quality because a service provider that monitors more networks is more likely to correlate attacks, identify new attacking patterns, and warn customers of events beyond their perimeters. In this sense, the security service provider also serves as an efficient information-sharing mechanism on security issues if the security service provider has a big customer base, and customers benefit from positive information carried over from other customers.

Despite all the benefits of outsourcing, organizations are still reluctant to share their data with third parties, and even less willing to publish them, mainly due to privacy concerns over sensitive information contained in such data. For example, important network configuration information, such as potential bottlenecks of the network, may be inferred from network traces in the data and subsequently exploited by adversaries to increase the impact of a denial of service attack.

FIG. 1 is a diagram of an IoT deployment where multiple IoT devices in different smart houses are connected to a IoT management platform through edge and core Cloud. Data and traffic produced by IoT devices are being monitored via security analytics and threat intelligence deployed in Core cloud to help ensure the security of these devices as a service to the customers. However, this data might carry personal data, and some can be quite sensitive. Outsourcing this data from customers premises to the cloud for analysis by a third-party security analyst brings data privacy questions to the forefront not only for customers but also for the security analyst (GDPR compliance). However, dealing with each customer data separately cannot efficiently be used to detect some types of attacks that target several customers/tenants at the same time such as for across-tenants anomaly detection. The latter detection requires correlation of events and information in the data belonging to different customers, but there is no existing system that provides the proper balance between privacy and functionality in this type of detection mechanism.

Although several efforts have proposed convincing privacy preserving schemes in centralized settings, unfortunately, these efforts are subjected to serious deficiencies including ad hoc definition of privacy, weak problem statement and system model making them difficult if not impossible to be applied in an outsourcing setting. In particular, one proposed scheme presents a new definition of privacy called Random Multiparty Perturbation (RMP) which is not an accredited definition of privacy leading to the fact that one cannot assure the RMP output will be protected against different side channel attacks. Recently, differential privacy has been widely recognized as the state-of-the-art privacy notion which by requiring the presence of any individual's data in the input, which may only marginally affect the distribution over the output, provides strong protection against adversaries with arbitrary background knowledge about the individuals.

One attempt towards proposing a differentially private network trace analysis was performed by benchmarking with the Privacy Integrated Queries (PINQ). However, applying PINQ directly to the network traces through the queries may lead to a serious privacy violation. Specifically, the strength of the randomization in a differentially private mechanism, to answer a query, is specified by a characteristics of the query and the dataset, called the sensitivity of the query, which is defined as the maximum value of a difference one individual can make in the output of the query. In the context of network trace analysis, one individual may contribute several records to the dataset resulting in a sensitivity value larger than one, whereas the privacy integrated queries (PINQ) assumes a sensitivity equal to one (this would sacrifice the privacy of individuals).

Differential Privacy

Differential privacy is a formal framework to provide useful statistical databases while quantifying the privacy level of the individual information in the database ($\epsilon$). One aspect of differential privacy is that the presence or absence of any individual data in the database may not affect the final released statistical information significantly, thus it can give strong privacy guarantees against an adversary with arbitrary auxiliary information. FIG. 2 is a block diagram of differential privacy where for all neighboring databases x and x' and for all subsets of transcripts: $Pr[A(x') \in S] \leq e^\epsilon Pr[A(x') \in S]$.

One example for mechanism A to achieve $\epsilon$—differential privacy is a Laplace mechanism which modifies an answer to a numerical query by adding zero-mean noise distributed according to a Laplace distribution with scale parameter $$b = \frac{\text{sensitivity}}{\epsilon}.$$

In particular, the Laplace distribution with mean zero and scale parameter b, denoted Lap (b), has density $$p(x; b) = \frac{1}{2b} \exp\left(-\frac{|x|}{b}\right).$$

However, while differential privacy probably obscures the presence or absence of individual records in a dataset, such indistinguishability property of differential privacy is in direct contradiction with anomaly detection which requires differentiating between anomalous and normal records, i.e., may require at least a minimum level of distinguishability for practical purposes such as anomaly detection. This problem of practicality has been addressed as an obstacle in front of applying differential privacy when searching for anomalies (outliers) in several existing works.

Further, since outlier detection aims to identify instances that are apparently distant from other instances, and the objective of differential privacy is to conceal the presence (or absence) of any particular instance, outlier detection and privacy protection are therefore intrinsically conflicting tasks. This conflict is an obstacle against a wide ranging solution, which is to say that the state-of-the-art in differentially private outlier detection lacks an algorithm to mitigate the aforementioned conflict. This would result in complications when a new system or model is of interest, and each of the existing works tackle the challenges entailed with their assumed/relaxed model of the problem. In particular, a method has been proposed for searching outliers, which can depend on data, but this is performed in a rather restricted setting (the input databases are guaranteed to have only one outlier, a structure which is not present in the typical available datasets).

In addition, other proposed solutions have tried to mitigate this problem using a collaborative setting by leveraging a Secure Multiparty Computation (SMC) protocol and based on a specific class of outlier detection function. Unfortunately, the amount of the noise injected to the output of the SMC protocol in these works is not regulated $$\left(\text{Lap}\left(\frac{M}{\epsilon}\right)\right)$$

where M is the number of attributes of the dataset) which results in weak accuracy due to the conflict discussed above, particularly when the dimensionality of the given subspace is high (e.g., above a certain threshold). Furthermore, although SMC can accurately conduct a set of analysis, unfortunately, its output is subjected to leaking sensitive information and it also incurs non-scalable computations.

More importantly, one existing work highlights such a conflict and introduces a mechanism based on the smooth upper bound of the local sensitivity (a relaxed version of the notion of differential privacy) and in a limited setting. However, this work does not provide a generic approach and the privacy/utility tradeoff may be lacking.

Finally, this conflict between differential privacy and anomaly detection has been studied under a specific system model, where labeling one single record as anomalous or normal by an algorithm with an emphasis on reducing false negative—labeling an anomaly as normal—rate is considered. However, such a specific system model corresponds to an extremely limited use case. In particular, as illustrated in the system model of FIG. 3, the system model assumes a trusted curator (i.e., security manager) has access to the database where the trusted curator answers the anomaly identification queries using a mechanism. The privacy of an individual is protected if the output of an anomaly identification mechanism is unaffected by the presence or the absence of the individual's record in the database (which is the input to the mechanism). In other words, in this setting, a data owner and a data analyst are the same entities and the goal of the privacy mechanism is to protect analyst's data against an untrusted party, e.g., a manufacturer of IoT devices, where such a scenario may be overly limiting in the real world.

In other words, most existing works in differentially private outlier analysis are unable to find the realistic relation between differential privacy and the semantic of the data, due, in part, to the problematic definition of the sensitivity for this type of datasets. Specifically, if the sensitivity is considered as the maximum value of a deviation one individual can make (those from anomalies), the randomization will fully destroy the usefulness of the data, e.g., one IP address in a network trace data may originate so many activities). On the other hand, smaller value for sensitivity may violate the privacy of individuals. This conflict has resulted in solutions with rather limited or even non-realistic models and applications (in comparison to, e.g., "outsourcing" outlier detection which is more practical and challenging).

SUMMARY

Some embodiments advantageously provide methods, systems, and apparatuses for differential privacy based anomaly detection.

One aim of one or more embodiments described herein is to present a model that addresses both outsourcing scenario and manufacturer scenario. To address such a challenging and comprehensive problem, one or more embodiments described herein provide an approach referred to as Differentially Private Outsourcing of Anomaly Detection (DPOD) which enforces a "sensitivity" value (a parameter of DP which defines the maximum difference one individual/party can make in the database) which with high probability protects the privacy of normal users/data owners but sacrifices the privacy of anomalous/outlier records inspired by the fact that most of anomalies are subjected to a certain detection threshold when being identified, and those thresholds are defined relatively higher than what a normal-behavior can conduct.

One aspect of the disclosure is for the data owner via a data node to identify and exclude the set of identified anomalies from his/her dataset with the goal of estimating a reasonably lower sensitivity and hence smaller noise injection. For this purpose, in one or more embodiments, a multi-step approach between data node(s) and the third-party outlier analyst, i.e., data analyst node is provided.

In one or more embodiments, the sensitivity of the outsourced data may be assumed to be as large as the baseline DP mechanisms, e.g., the maximum possible distance of a record from the center of its bins in a histogram. Then, using collaborative outlier detection from all data owners involved, data owners are provided with realistic values of the sensitivity (expectedly lower than the expected value). In particular, each data owner (optimally) spends a portion of his/her privacy budget to build a better estimation of the sensitivity, providing less privacy for the outliers while keeping good privacy for the normal or non-outlier cases.

The algorithm below is presented for only one data owner, but the algorithm/approach can be generalized for multiple data owners. FIG. 4 is an example model for implementing the algorithm.

At stage 1) Preliminary DP (performed by data owner and/or data node)
1.1) A total privacy budget (i.e., epsilon) is defined by the data owner. At this stage this total budget may need to be shared among stages 1 and 3, described herein, which may be referred to as Epsilon1 for stage 1 and Epsilon 3 for stage 3. As an exemplary approach, the values of Epsilon1 and Epsilon3 are defined using Kelly criterion.
1.2) The data node applies a DP with privacy budget Epsilon1, and the global sensitivity (i.e., the sensitivity values which reports the sensitivity of all the records, delta q) is applied then to the data set.
1.3) The data set with applied sensitivity is sent to the data analyst node.

At the stage 2) Privacy budget estimation is performed by the data analyst, i.e., security management entity.
2.1) The data analyst node defines the outliers in the received dataset (i.e., privatized dataset). A score of anomaly is applied to different data points. This outline score is used to define the outliers. As an example solution, the outliers are marked.
2.2) The data analyst node performs the sensitivity estimation. The new estimated sensitivity is now calculated to reduce privacy for the outliers (and is keep the same privacy for the data sets with normal behavior or for the non-outliers) in the dataset on step 1.
2.3) The new estimated sensitivity is sent back to the data node for the tuning. At the stage 3, the privacy budget tuning stage (performed by data node).
3.1) the data node updates the sensitivity value using the calculated anomaly scores of each record according to his privacy budget Epsilon3 at this stage. As an example process of performing this update, the data node may use sensitivity sampler to estimate new value of the sensitivity according to the anomaly scores.
3.2) Next, data node applies DP according to the sensitivity value as defined. The data node sends this new data set with tuned DP to the data analyst node. At the stage 4, the tuned analysis (performed by data analyst node)
4.1) The data analyst node performs the analysis with the new tuned DP which provides better privacy for normal datasets and less privacy for the outliers.

An evaluation using both real network data and real credit card data verifies that this algorithm can significantly improve the accuracy of (facilitate) collaborative outlier detection.

Further, DPOD, in accordance with one or more embodiments, provides one or more of the following advantages:
DPOD provides an innovative system that enables outsourcing of anomaly detection to a third party.
DPOD provides for collaborative anomaly detection system (i.e., DPOD system) between data owners and data analyst node via a data node. The system receives the input from the data owners and the data analyst node. Each data owner spends a portion of his/her privacy budget to build a rough estimation of the sensitivity. Each data analyst node provides the data node with an updated sensitivity value using the calculated anomaly scores of each record.
DPOD significantly improves the accuracy of differentially private anomaly detection using a two-round communication between data owners and third-party analysts (i.e., data analyst node).
The framework can be used in settings with one or more number of data owners.
The DPOD is instantiated based on the well-studied DP histogram publication which is a data type sufficient for outlier detection (compared with Small-DB which generates DP synthetic dataset but may not be practical as it is exponential in complexity with respect to the size of the dataset). One or more outsourcing DP mechanisms, e.g., smallDB, multiplicative gain, etc., which output more appropriate data types can also be used.
The DPOD system maintains all the operation processes from data node/data owner side, which may require non-effort from data owner's side to get used to the DPOD system.

According to one aspect of the disclosure, a data node is provided. The data node includes processing circuitry configured to receive an anomaly estimation for a first privatized dataset where the first private dataset is based on a dataset and a first noise profile, apply a second noise profile to the dataset to generate a second privatized dataset where the second noise profile is based at least on the anomaly estimation, and optionally cause transmission of the second privatized dataset for anomaly estimation.

According to one or more embodiments of this aspect, the processing circuitry is further configured to determine an updated sensitivity value for the dataset based at least on the anomaly estimation and privacy budget where the second noise profile is further based at least on the updated sensitivity value. According to one or more embodiments of this aspect, the dataset includes outlier data and non-outlier data where the second noise profile is configured to reduce noise applied to outlier data when compared to a noise applied to outlier data by the first noise profile. According to one or more embodiments of this aspect, the dataset includes outlier data and non-outlier data where the second noise profile is configured to increase noise applied to non-outlier data when compared to noise applied to the non-outlier data by the first noise profile.

According to one or more embodiments of this aspect, the processing circuitry is further configured to apply the first noise profile to outlier data in the dataset. The applying of the second noise profile to the dataset to generate the second privatized dataset includes applying the second noise profile to non-outlier data in the dataset. According to one or more embodiments of this aspect, the anomaly estimation indicates an anomaly score for a respective privatized dataset. According to one or more embodiments of this aspect, the processing circuitry is further configured to receive a sensitivity estimation that is based on the first privatized dataset where the sensitivity estimation indicates whether to modify the first noise profile, and where the second noise profile is further based at least on the sensitivity estimation.

According to one or more embodiments of this aspect, the sensitivity estimation indicates to reduce privacy for outlier data of the dataset while at least maintaining privacy for non-outlier data of the dataset. According to one or more embodiments of this aspect, the first noise profile provides a first data sensitivity value for the first privatized dataset. The second noise profile provides a second data sensitivity value for the second privatized dataset, and where the second data sensitivity value is different from the first data sensitivity value. According to one or more embodiments of this aspect, the respective noise profiles each correspond to a respective differential privacy mechanism configured to quantify a privacy level provided to the data. According to one or more embodiments of this aspect, the first privatized dataset is a first privatized histogram of the dataset and the second privatized dataset is a second privatized histogram of the dataset.

According to another aspect of the disclosure, a data analyst node is provided. The data analyst node includes processing circuitry configured to: cause transmission of an anomaly estimation for a first privatized dataset where the first privatized dataset is based on dataset and a first noise profile, receive a second privatized dataset that is based on the dataset and a second noise profile different from the first noise profile where the second noise profile is based at least on the anomaly estimation, and optionally perform anomaly estimation for the second privatized dataset.

According to one or more embodiments of this aspect, the dataset includes outlier data and non-outlier data where the second noise profile is configured to reduce noise applied to outlier data when compared to a noise applied to outlier data by the first noise profile. According to one or more embodiments of this aspect, the dataset includes outlier data and non-outlier data where the second noise profile further is configured to increase noise applied to non-outlier data when compared to noise applied to the non-outlier data by the first noise profile. According to one or more embodiments of this aspect, the anomaly estimation indicates an anomaly score for a respective privatized dataset.

According to one or more embodiments of this aspect, the first noise profile provides a first data sensitivity value for the first privatized dataset, and the second noise profile provides a second data sensitivity value for the second privatized dataset, and the second data sensitivity value is different from the first data sensitivity value. According to one or more embodiments of this aspect, the processing circuitry is further configured to determine a sensitivity estimation that is based on the first privatized dataset where the sensitivity estimation indicates whether to modify the first noise profile, and the second noise profile is further based at least on the sensitivity estimation. According to one or more embodiments of this aspect, the sensitivity estimation indicates to reduce privacy for outlier data of the dataset while at least maintaining privacy for non-outlier data of the dataset.

According to one or more embodiments of this aspect, the processing circuitry is further configured to cause transmission of the anomaly estimation for the second privatized dataset. According to one or more embodiments of this aspect, the first privatized dataset is a first privatized histogram of the dataset and the second privatized dataset is a second privatized histogram of the dataset.

According to another aspect of the disclosure, a method implemented by a data node is provided. An anomaly estimation for a first privatized dataset is received where the first private dataset is based on a dataset and a first noise profile. A second noise profile is applied to the dataset to generate a second privatized dataset where the second noise profile is based at least on the anomaly estimation. Transmission is optionally caused of the second privatized dataset for anomaly estimation.

According to one or more embodiments of this aspect, an updated sensitivity value for the dataset is determined based at least on the anomaly estimation and privacy budget w here the second noise profile is further based at least on the updated sensitivity value. According to one or more embodiments of this aspect, the dataset includes outlier data and non-outlier data where the second noise profile is configured to reduce noise applied to outlier data when compared to a noise applied to outlier data by the first noise profile. According to one or more embodiments of this aspect, the dataset includes outlier data and non-outlier data where the second noise profile is configured to increase noise applied to non-outlier data when compared to noise applied to the non-outlier data by the first noise profile.

According to one or more embodiments of this aspect, the first noise profile is applied to outlier data in the dataset and the applying of the second noise profile to the dataset to generate the second privatized dataset includes applying the second noise profile to non-outlier data in the dataset. According to one or more embodiments of this aspect, the anomaly estimation indicates an anomaly score for a respective privatized dataset. According to one or more embodiments of this aspect, a sensitivity estimation that is based on the first privatized dataset is received where the sensitivity estimation indicates whether to modify the first noise profile, and the second noise profile is further based at least on the sensitivity estimation.

According to one or more embodiments of this aspect, the sensitivity estimation indicates to reduce privacy for outlier data of the dataset while at least maintaining privacy for non-outlier data of the dataset. According to one or more embodiments of this aspect, the first noise profile provides a first data sensitivity value for the first privatized dataset where the second noise profile provides a second data sensitivity value for the second privatized dataset, and the second data sensitivity value is different from the first data sensitivity value. According to one or more embodiments of this aspect, the respective noise profiles each correspond to a respective differential privacy mechanism configured to quantify a privacy level provided to the data. According to one or more embodiments of this aspect, the first privatized dataset is a first privatized histogram of the dataset and the second privatized dataset is a second privatized histogram of the dataset.

According to another aspect of the disclosure, a method implemented by a data analyst node is provided. Transmission is caused of an anomaly estimation for a first privatized dataset where the first privatized dataset is based on dataset and a first noise profile. A second privatized dataset that is based on the dataset and a second noise profile different from the first noise profile is received. The second noise profile is based at least on the anomaly estimation. Anomaly estimation is optionally performed for the second privatized dataset.

According to one or more embodiments of this aspect, the dataset includes outlier data and non-outlier data where the second noise profile is configured to reduce noise applied to outlier data when compared to a noise applied to outlier data by the first noise profile. According to one or more embodiments of this aspect, the dataset includes outlier data and non-outlier data where the second noise profile further is configured to increase noise applied to non-outlier data when compared to noise applied to the non-outlier data by the first noise profile. According to one or more embodiments of this aspect, the anomaly estimation indicates an anomaly score for a respective privatized dataset.

According to one or more embodiments of this aspect, the first noise profile provides a first data sensitivity value for the first privatized dataset. The second noise profile provides a second data sensitivity value for the second privatized dataset, and the second data sensitivity value is different from the first data sensitivity value. According to one or more embodiments of this aspect, a sensitivity estimation that is based on the first privatized dataset is determined where the sensitivity estimation indicates whether to modify the first noise profile, and the second noise profile is further based at least on the sensitivity estimation. According to one or more embodiments of this aspect, the sensitivity estimation indicates to reduce privacy for outlier data of the dataset while at least maintaining privacy for non-outlier data of the dataset.

According to one or more embodiments of this aspect, transmission is caused of the anomaly estimation for the second privatized dataset. According to one or more embodiments of this aspect, the first privatized dataset is a first privatized histogram of the dataset and the second privatized dataset is a second privatized histogram of the dataset.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 13 is an example of the DPOD algorithm according to some embodiments of the present disclosure;

DETAILED DESCRIPTION

Figure 1:
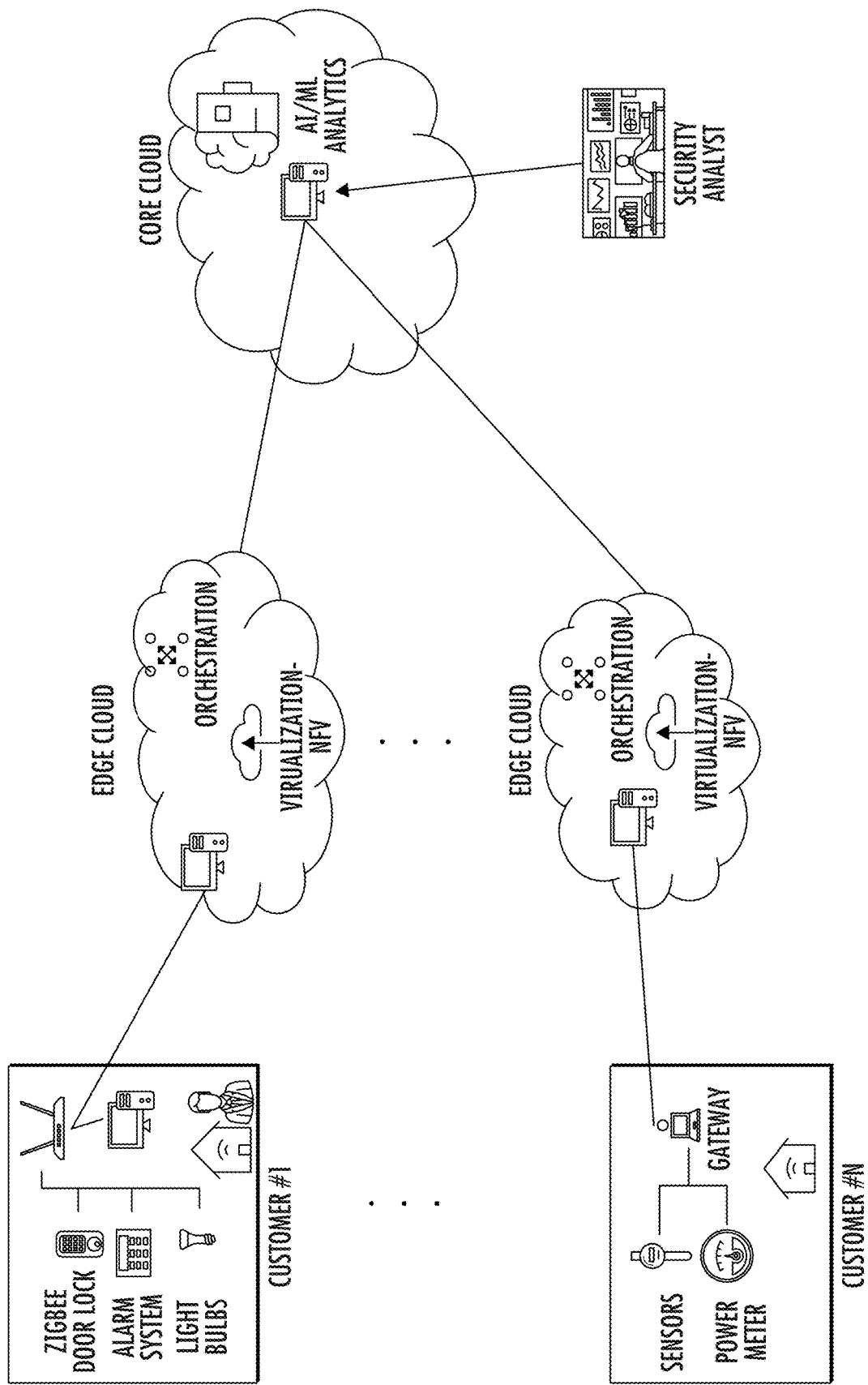
FIG. 1 is a diagram of across tenant anomaly detection.
Figure 2:
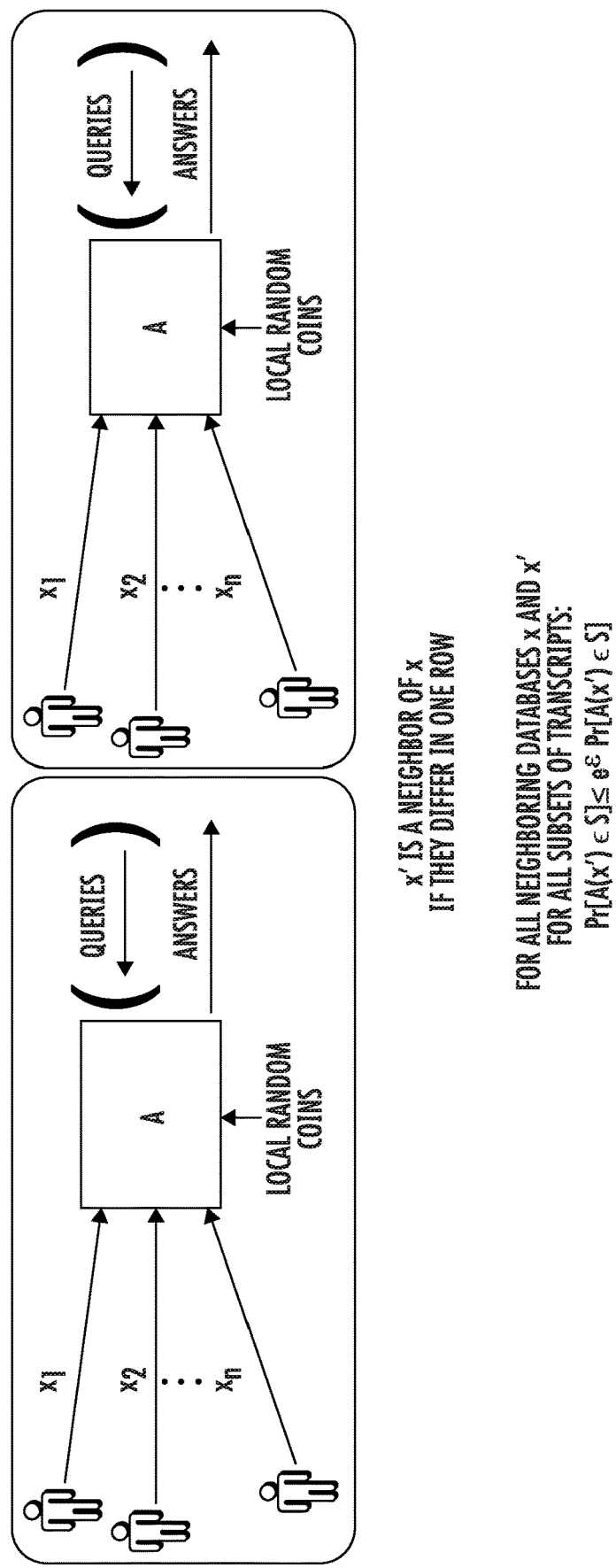
FIG. 2 is a system for differential privacy.
Figure 3:
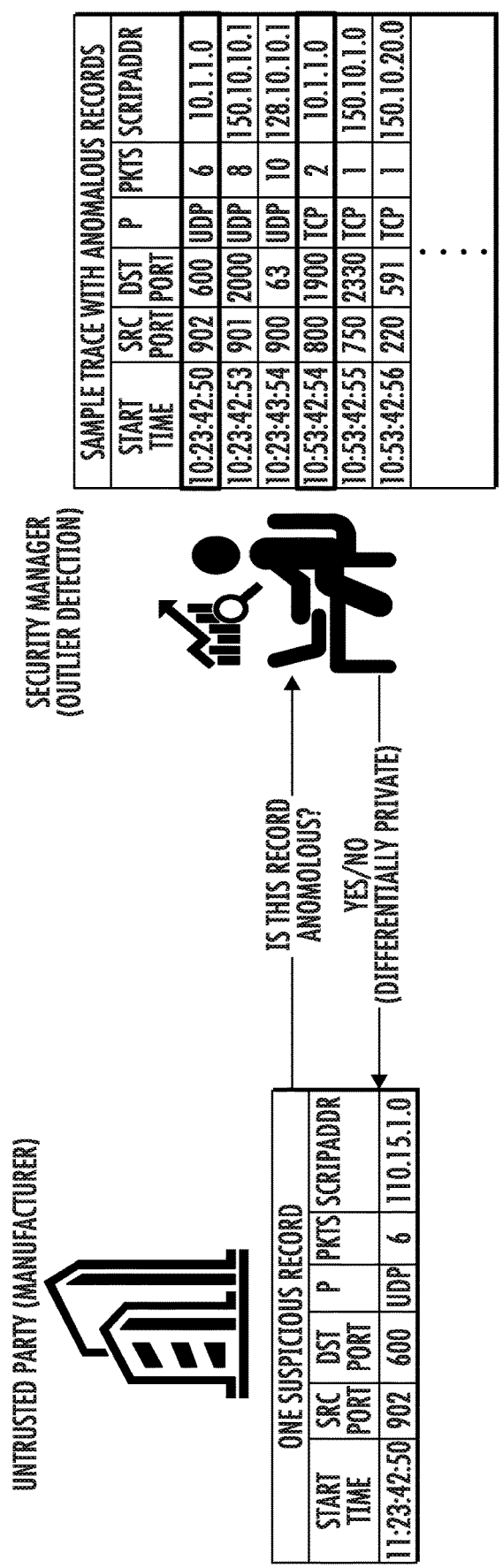
FIG. 3 is a system model.
Figure 4:
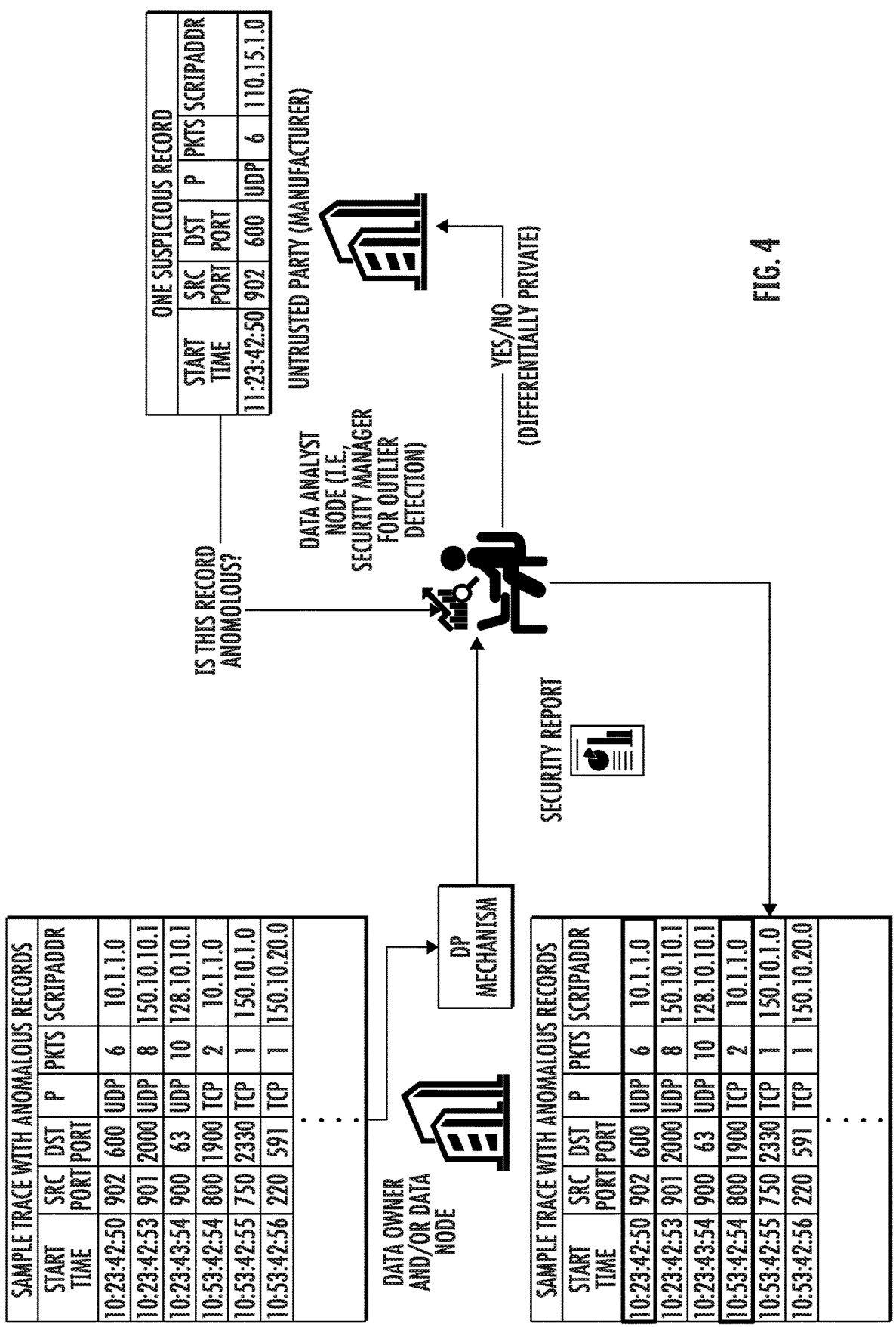
FIG. 4 is a tackled model according to the principles of the disclosure.

One aim of one or more embodiments described herein is to present a model that addresses both outsourcing scenario and manufacturer scenario. To address such a challenging and comprehensive problem, one or more embodiments described herein provide an approach called DPOD which enforces a "sensitivity" value (a parameter of DP which defines the maximum difference one individual can make in the database) which with high probability protects the privacy of records of normal users (i.e., non-outlier data) but sacrifices the privacy of anomalous records (i.e., outlier data) inspired by the fact that most of anomalies are subjected to a certain detection threshold when being identified, and those thresholds are defined relatively higher than what a normal-behavior can conduct. One aspect of this approach is for the data owner/data node to identify and exclude the set of identified anomalies from his/her dataset with the goal of estimating a reasonably lower sensitivity and hence smaller noise injection.

Some difference between DPOD and R2DP:

Note that in R2DP, query and sensitivity are provided as input to the system. R2DP then provides the adapted DP as an input. Therefore, there is no interactions between the data analyst and the data owner. In the approach described herein, the data analyst node and the data owner/data node collaborate together to setup an optimal sensitivity value based on computed outlier scores provided by the data analyst node for the tuning of final DP. That is, the data owner may want a sensitivity value that provides higher privacy while the data analyst wants a different sensitivity value that provides lower privacy.

DPOD scenario assumes a component (i.e., DPOD manager) is collecting the datasets and privacy constraints from one or more data owners (e.g., IoT devices) and communicating with data analyst node (e.g., ESM) to determine the optimal anonymization and the security analysis results.

Additionally, for DPOD, one use case is the ability to outsource the analysis from the data owner with limited resources (e.g., IoT devices) to the data analyst (e.g., ESM). While for the R2DP, the use case is for the data owner to have the optimal anonymization for its data set.

One or more embodiments described herein allow for data analyst node to perform anomaly detection while protecting the privacy of customers data (using strong notion of differential privacy). One or more embodiments of the approach described herein considers a model including any number of outliers (i.e., outlier data in a dataset). Further, one or more embodiments of the approach can tune the privacy to the utility needs of the search and therefore resulting in more accurate results such as by increase noise applied to non-outlier data while reducing or maintaining noise applied to outlier data. In comparison to one or more existing systems, one or more embodiments of the approach described herein provides better privacy/utility tradeoff by better distributing the total DP budget and is applicable for a more generic setting. Further, by providing a more general and practical approach, the teachings of the disclosure may be applicable to various use cases.

Before describing in detail exemplary embodiments, it is noted that the embodiments reside primarily in combinations of apparatus components and processing steps related to differential privacy based anomaly detection. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

Note further, that functions described herein as being performed by a data analyst node (e.g., security management entity), or data node (one or more DPOD entities) may be distributed over a plurality of entities/nodes. In other words, it is contemplated that the functions of the data analyst node and/or data node described herein are not limited to performance by a single physical device and, in fact, can be distributed among several physical entities. In one or more embodiments, security management entity is referred to as a data analyst node and vice-versa.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 5:
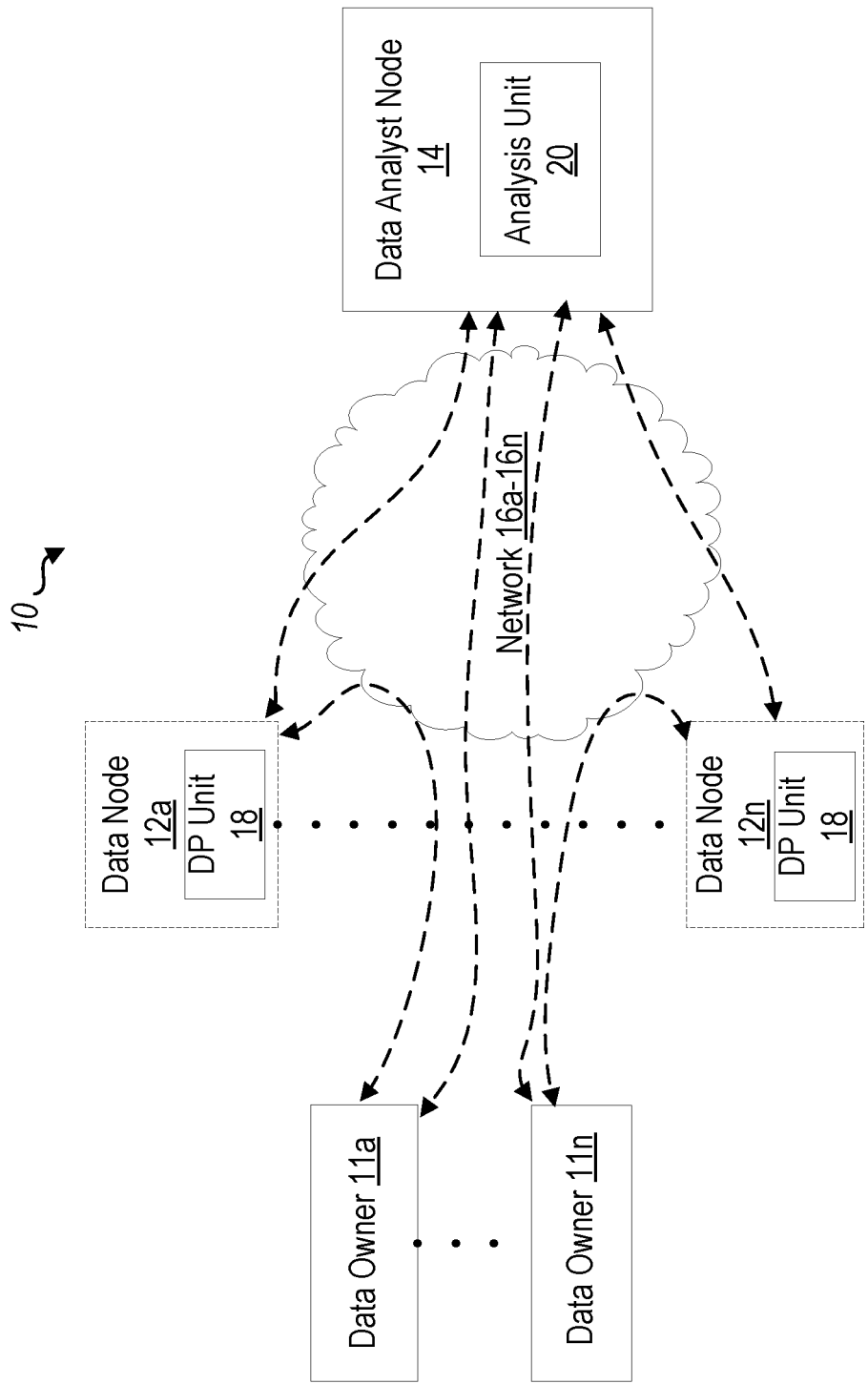
FIG. 5 is a block diagram of an example system according to the principles in the present disclosure.

Referring now to the drawing figures, in which like elements are referred to by like reference numerals, there is shown in FIG. 5 a schematic diagram of a system 10, i.e., DPOD system 10, according to an embodiment, which comprises data owners 11a-11n (collectively referred to as data owner 11), one or more data nodes 12a-12n (collectively referred to as data node 12), and data analyst node 14, where one or more of these entities may be in direct and/or indirect communication with each other via one or more networks 16a-16n (collectively referred to as network 16). Data node 12 may include differential privacy (DP) unit 18 that is configured to perform one or more data node 12 functions as described herein. Data node 12 may include one or more DPOD entities such as a DPOD manager, budget allocator, DP mechanism chooser, DP histogram entity (also referred to as DP histogram publishing entity), etc., as described herein. In one or more embodiments, one or more DPOD entities (DPOD manager, budget allocator, DP mechanism chooser, DP histogram entity, etc.) may be provided by one or more standalone devices.

Data analyst node 14 may correspond to an entity that one or more of monitors, analyzes, compiles controls, performs analytics, performs security functions, performs other functions described herein, etc. In one or more embodiments, the data analyst node 14 may generally provide a solution for end to end security management, supporting different domains (e.g., device, access network and connectivity, applications and cloud) consisting of different trust anchors and security functions. The data analyst node 14 may generally provide the possibility to collect, store and analyze traffic and data from the different layers.

The data analyst node 14 may perform continuous protection including security analytics, which can provide, using the data, one or more of: security insights and actions, covering vulnerabilities, threats, risks, and fraud events. The security analytics aim for faster response times and shortening the detection time for security and privacy breaches. The security analytics may use rule and machine learning based analytics for detecting known and unknown threats across different network domains. Further, the security analytics may provide constant visibility to the risk landscape and help to target actions to higher risk areas to reduce the attack surface and/or probability of attack. In particular, data may be collected in the form of datasets, as described herein, whether the data analyst node 14 may perform anomaly detection, among other functions, as described herein. Data analyst node 14 includes analysis unit 20 for performing one or more data analyst node 14 functions as described herein.

An example implementation in accordance with one or more embodiments, of data node 12 and data analyst node 14 discussed in the preceding paragraphs will now be described with reference to FIG. 6. data analyst node 14 includes hardware (HW) 24 including a communication interface 26 configured to set up and maintain a wired or wireless connection with an interface of a different entity of the system 10. The data analyst node 14 further comprises processing circuitry 28, which may have storage and/or processing capabilities. The processing circuitry 28 may include a processor 30 and memory 32 (i.e., a computer readable storage medium such as a non-transitory computer readable storage medium). In particular, in addition to or instead of a processor, such as a central processing unit, and memory, the processing circuitry 28 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 30 may be configured to access (e.g., write to and/or read from) memory 32, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 28 may be configured to control any of the methods and/or processes described herein and/or to cause such methods, and/or processes to be performed, e.g., by data analyst node 14. Processor 30 corresponds to one or more processors 30 for performing data analyst node 14 functions described herein. The data analyst node 14 includes memory 32 that is configured to store data, programmatic software code and/or other information described herein. In some embodiments, the software 34 that may include instructions that, when executed by the processor 30 and/or processing circuitry 28, causes the processor 30 and/or processing circuitry 28 to perform the processes described herein with respect to data analyst node 14. The instructions may be software associated with the data analyst node 14.

The software 34 may be executable by the processing circuitry 28. The processing circuitry 28 and the processor 30 of the data analyst node 14 may include an analysis unit 20 that is configured to perform one or more data analyst node 14 functions described herein.

The system 10 further includes data node 12 provided in a system 10 and including hardware 36 enabling it to communicate with the data analyst node 14, data owner 11 and/or other entities in system 10. The hardware 36 may include a communication interface 38 for setting up and maintaining a wired or wireless connection with an interface of a different entity of the system 10. In the embodiment shown, the hardware 36 further includes processing circuitry 40. The processing circuitry 40 may include a processor 42 and a memory 44. In particular, in addition to or instead of a processor, such as a central processing unit, and memory, the processing circuitry 40 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 42 may be configured to access (e.g., write to and/or read from) the memory 44, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the data node 12 has software 46 stored internally in, for example, memory 44, or stored in external memory (e.g., database, storage array, network storage device, etc.) accessible by data node 12 via an external connection. The software 46 may be executable by the processing circuitry 40. The processing circuitry 40 may be configured to control any of the methods and/or processes described herein and/or to cause such methods, and/or processes to be performed, e.g., by data node 12. Processor 42 corresponds to one or more processors 42 for performing data node 12 functions described herein. The memory 44 is configured to store data, programmatic software code and/or other information described herein. In some embodiments, the software 46 may include instructions that, when executed by the processor 42 and/or processing circuitry 40, causes the processor 42 and/or processing circuitry 40 to perform the processes described herein with respect to data node 12. For example, processing circuitry 40 of the data node 12 may include DP unit 18 for performing one or more data node 12 functions as described herein. In one or more embodiments, DP unit 18 may provide one or more of the following DPOD entities: DPOD manager, budget allocator, DP mechanism chooser, DP histogram entity, etc., as described herein.

Figure 6:
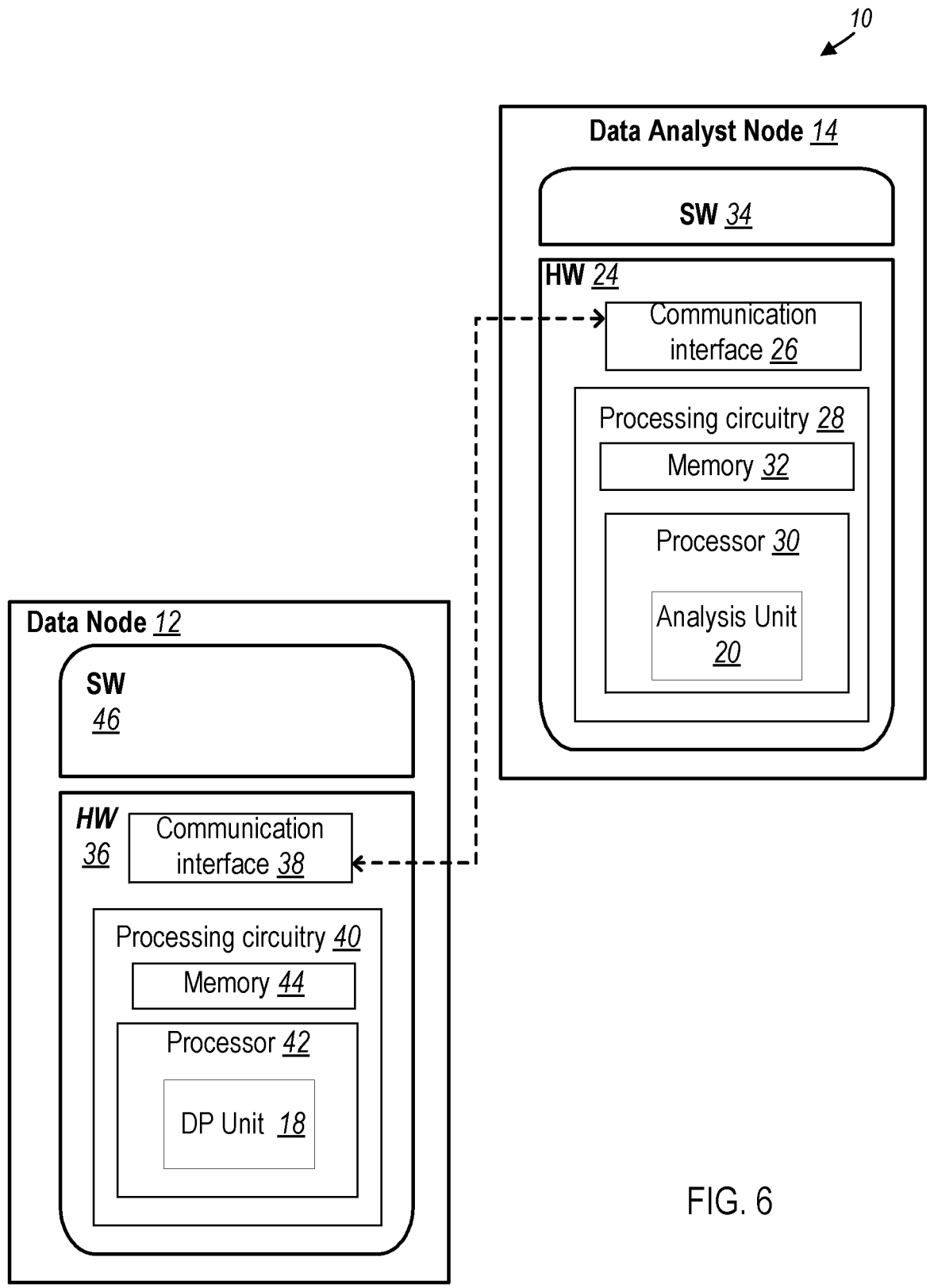
FIG. 6 is a block diagram of some entities in the system according to the principles in the present disclosure.

In some embodiments, the inner workings of the data analyst node 14 and data node 12 may be as shown in FIG. 6 and independently, the surrounding network topology may be that of FIG. 5.

Although FIGS. 5 and 6 show various "units" such as DP unit 18 and analysis unit 20 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 7:
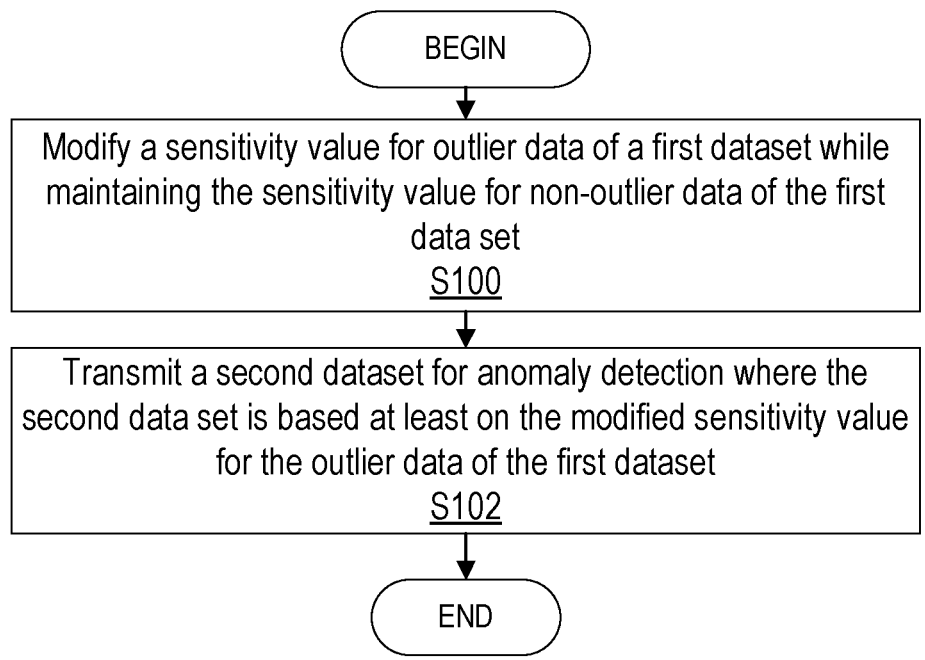
FIG. 7 is a flowchart of an example process in a data node according to some embodiments of the present disclosure.

FIG. 7 is a flowchart of an example process implemented by data node 12 according to some embodiments of the disclosure. One or more Blocks and/or functions performed by data node 12 may be performed by one or more elements of data node 12 such as by DP unit 18, processing circuitry 40, memory 44, processor 42, etc. In one or more embodiments, data node 12 is configured to modify (Block S100) a sensitivity value for outlier data of a first dataset while maintaining the sensitivity value for non-outlier data of the first data set, as described herein. In one or more embodiments, data node 12 is configured to transmit (Block S102) a second dataset for anomaly detection where the second data set is based at least on the modified sensitivity value for the outlier data of the first dataset, as described herein. According to one or more embodiments, processing circuitry 40 is further configured to generate the second dataset by applying a differential privacy based function using the modified sensitivity value.

Figure 8:
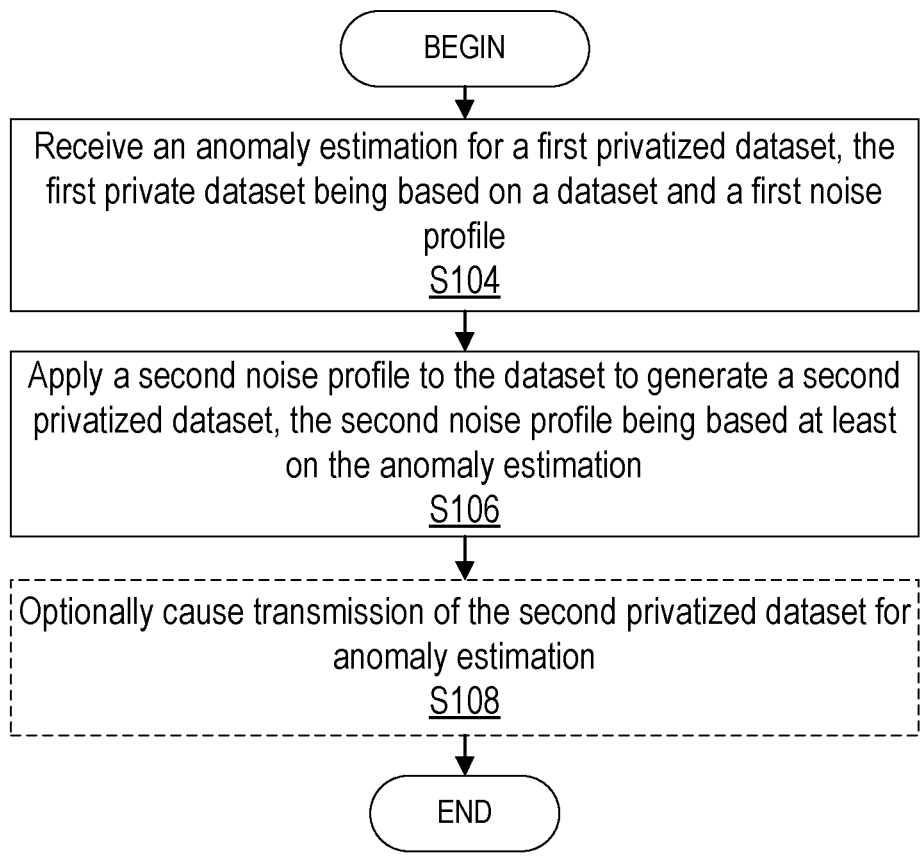
FIG. 8 is a flowchart of another example process in a data node according to some embodiments of the present disclosure.

FIG. 8 is a flowchart of an example process implemented by data node 12 according to some embodiments of the disclosure. One or more Blocks and/or functions performed by data node 12 may be performed by one or more elements of data node 12 such as by DP unit 18, processing circuitry 40, memory 44, processor 42, etc. In one or more embodiments, data node 12 is configured to receive (Block S104) an anomaly estimation for a first privatized dataset where the first private dataset is based on a dataset and a first noise profile, as described herein. In one or more embodiments, data node 12 is configured to apply (Block S106) a second noise profile to the dataset to generate a second privatized dataset where the second noise profile is based at least on the anomaly estimation, as described herein. In one or more embodiments, data node 12 is configured to optionally cause (Block S108) transmission of the second privatized dataset for anomaly estimation, as described herein.

According to one or more embodiments, the processing circuitry 40 is further configured to determine an updated sensitivity value for the dataset based at least on the anomaly estimation and privacy budget where the second noise profile is further based at least on the updated sensitivity value. According to one or more embodiments, the dataset includes outlier data and non-outlier data, the second noise profile configured to reduce noise applied to outlier data when compared to a noise applied to outlier data by the first noise profile. According to one or more embodiments, the dataset includes outlier data and non-outlier data, the second noise profile configured to increase noise applied to non-outlier data when compared to noise applied to the non-outlier data by the first noise profile.

According to one or more embodiments, the processing circuitry 40 is further configured to apply the first noise profile to outlier data in the dataset. The applying of the second noise profile to the dataset to generate the second privatized dataset includes applying the second noise profile to non-outlier data in the dataset. According to one or more embodiments, the anomaly estimation indicates an anomaly score for a respective privatized dataset. According to one or more embodiments, the processing circuitry 40 is further configured to receive a sensitivity estimation that is based on the first privatized dataset where the sensitivity estimation indicates whether to modify the first noise profile where the second noise profile is further based at least on the sensitivity estimation.

According to one or more embodiments, the sensitivity estimation indicates to reduce privacy for outlier data of the dataset while at least maintaining privacy for non-outlier data of the dataset. According to one or more embodiments, the first noise profile provides a first data sensitivity value for the first privatized dataset. The second noise profile provides a second data sensitivity value for the second privatized dataset and the second data sensitivity value is different from the first data sensitivity value. According to one or more embodiments, the respective noise profiles each correspond to a respective differential privacy mechanism configured to quantify a privacy level provided to the data. According to one or more embodiments, the first privatized dataset is a first privatized histogram of the dataset and the second privatized dataset is a second privatized histogram of the dataset.

Figure 9:
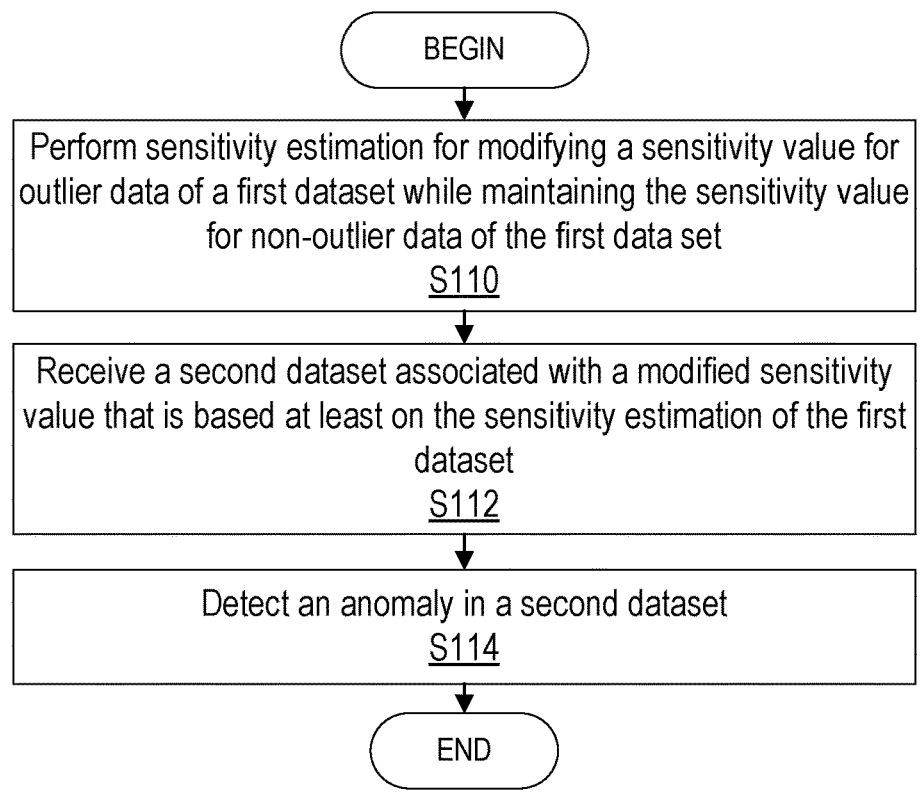
FIG. 9 is a flowchart of an example process in a data analyst node according to some embodiments of the present disclosure.

FIG. 9 is a flowchart of an example process in data analyst node 14 according to some embodiments of the disclosure. One or more Blocks and/or functions performed by data analyst node 14 may be performed by one or more elements of data analyst node 14 such as by analysis unit 20, processing circuitry 28, processor 30, communication interface 26, etc. In one or more embodiments, data analyst node 14 is configured to perform (Block S110) sensitivity estimation for modifying a sensitivity value for outlier data of a first dataset while maintaining the sensitivity value for non-outlier data of the first data set, as described herein. In one or more embodiments, data analyst node 14 is configured to receive (Block S112) a second dataset associated with a modified sensitivity value that is based at least on the sensitivity estimation of the first data set, as described herein. In one or more embodiments, data analyst node 14 is configured to detect (Block S114) an anomaly in a second dataset, as described herein. According to one or more embodiments, the performing of the sensitivity estimation includes: scoring each data point in the first dataset with a respective anomaly score; and identifying outliers in the first dataset based on the scoring of each data point.

Figure 10:
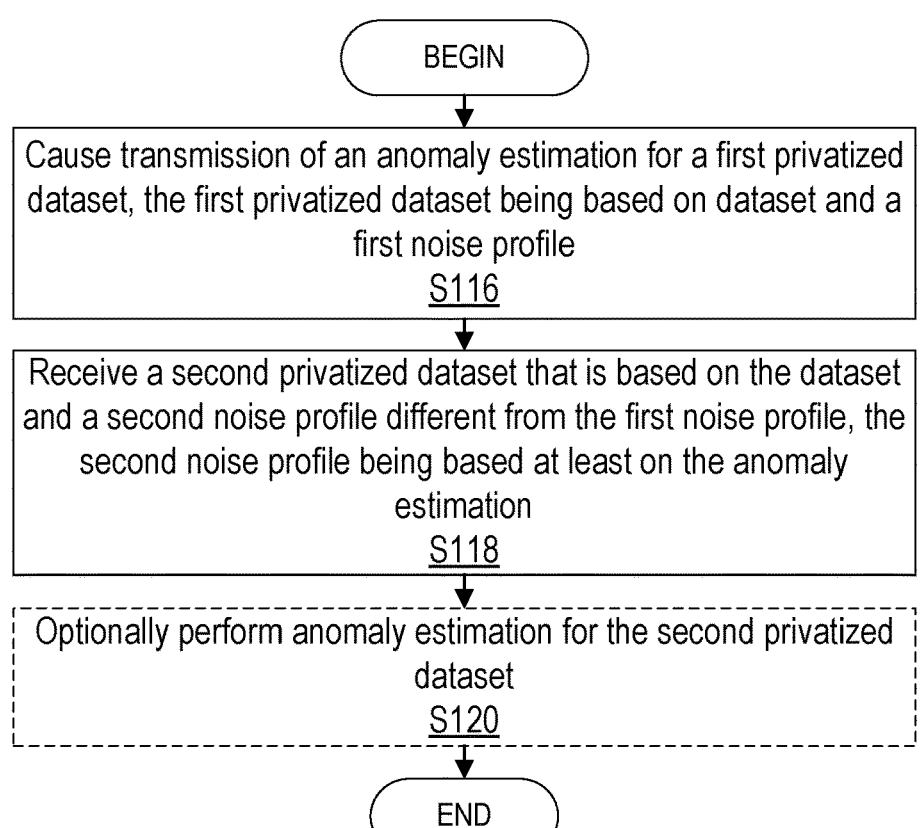
FIG. 10 is a flowchart of another example process in a data analyst node according to some embodiments of the present disclosure.

FIG. 10 is a flowchart of an example process in data analyst node 14 according to some embodiments of the disclosure. One or more Blocks and/or functions performed by data analyst node 14 may be performed by one or more elements of data analyst node 14 such as by analysis unit 20, processing circuitry 28, processor 30, communication interface 26, etc. In one or more embodiments, data analyst node 14 is configured to cause (Block S116) transmission of an anomaly estimation for a first privatized dataset, the first privatized dataset being based on dataset and a first noise profile, as described herein. In one or more embodiments, data analyst node 14 is configured to receive (Block S118) a second privatized dataset that is based on the dataset and a second noise profile different from the first noise profile where the second noise profile is based at least on the anomaly estimation, as described herein. In one or more embodiments, data analyst node 14 is configured to optionally perform (Block S120) anomaly estimation for the second privatized dataset, as described herein.

According to one or more embodiments, the dataset includes outlier data and non-outlier data where the second noise profile configured to reduce noise applied to outlier data when compared to a noise applied to outlier data by the first noise profile. According to one or more embodiments, the dataset includes outlier data and non-outlier data where the second noise profile is further configured to increase noise applied to non-outlier data when compared to noise applied to the non-outlier data by the first noise profile. According to one or more embodiments, the anomaly estimation indicates an anomaly score for a respective privatized dataset.

According to one or more embodiments, the first noise profile provides a first data sensitivity value for the first privatized dataset. The second noise profile provides a second data sensitivity value for the second privatized dataset and the second data sensitivity value is different from the first data sensitivity value. According to one or more embodiments, the processing circuitry 28 is further configured to determine a sensitivity estimation that is based on the first privatized dataset where the sensitivity estimation indicates whether to modify the first noise profile and the second noise profile is further based at least on the sensitivity estimation. According to one or more embodiments, the sensitivity estimation indicates to reduce privacy for outlier data of the dataset while at least maintaining privacy for non-outlier data of the dataset.

According to one or more embodiments, the processing circuitry 28 is further configured to cause transmission of the anomaly estimation for the second privatized dataset. According to one or more embodiments, the first privatized dataset is a first privatized histogram of the dataset and the second privatized dataset is a second privatized histogram of the dataset.

Having generally described arrangements for differential privacy based anomaly detection, details for these arrangements, functions and processes are provided as follows, and which may be implemented by the data node 12, data analyst node 14, etc. In particular, one or more data node 12 functions described below may be performed by one or more of processing circuitry 40, processor 42, DP unit 18, etc. while one or more data analyst node 14 functions described below may be performed by one or more of processing circuitry 28, processor 30, analysis unit 20, etc. Further, while data node 12 and data owner 11 are shown as separate entities, in one or more embodiments, one or more functions of data node 12 may be implemented by data owner 11.

Embodiments provide differential privacy based anomaly detection. Table 1 of notations and descriptions is provided below.

| Notations | Descriptions |
| --- | --- |
| $\epsilon_1, \epsilon_2, \ldots, \epsilon_n$ | Privacy constraint from data owners 11 |
| $\Delta q_i$ | Updated sensitivity at iteration i |
| b | Noise parameter in Laplace mechanism |
| $\omega$ | Noise |
| $\widetilde{H}_i$ | DP histogram at iteration i |

The policy of No differential privacy for Anomalies is inspired by the fact that most of anomalies are subjected to a certain detection threshold when being identified (either using abnormal frequency or very small probability of occurring such that they are identified as "rare"), and those thresholds are defined relatively higher than what a normal-behavior can conduct. Therefore, during a first stage, the sensitivity of the outsourced data is assumed to be as large as the baseline DP mechanisms (i.e., noise profiles), e.g., the maximum possible distance of a record from the center of its bins in a histogram. In this example, this round/first stage, using collaborative outlier detection from all data owners 11 involved, provides data owners 11 with realistic values of the sensitivity, which may be expected to be lower. The first stage/round may include steps 1-6 while the second stage/round includes steps 7-10, which are described in detail with respect to FIG. 11.

In this first stage, each data owner 11 (optimally) spends a portion of its privacy budget to build a rough estimation of the sensitivity (e.g., c-DP) such that the data analyst node 14 may provide data node 12 with an updated sensitivity value using the calculated anomaly scores of each record. In the system model, the data analyst node 14, may be considered to be an "honest but-curious" analyst (in the sense that it will exactly follow the approach to conduct reliable analyses). Next, each data owner 11 via data node 12 spends the rest of his/her budget in the second round and using the updated version of the sensitivity. The evaluation of this process and system model using both real network data and real credit card data verifies that the solution can significantly improve the accuracy of (facilitate) collaborative outlier detection.

Possible Assumptions:

In one or more embodiments, the data analyst node 14, i.e., security management entity, may be assumed to be semi-trusted. Semi-trusted may refer to that the data analyst node 14 is bound to conduct trusted security analysis tasks e.g., maintaining the reputation of the company.

The DPOD System 10

In this section, the system 10 is first described, then the corresponding workflow is described.

Figure 11:
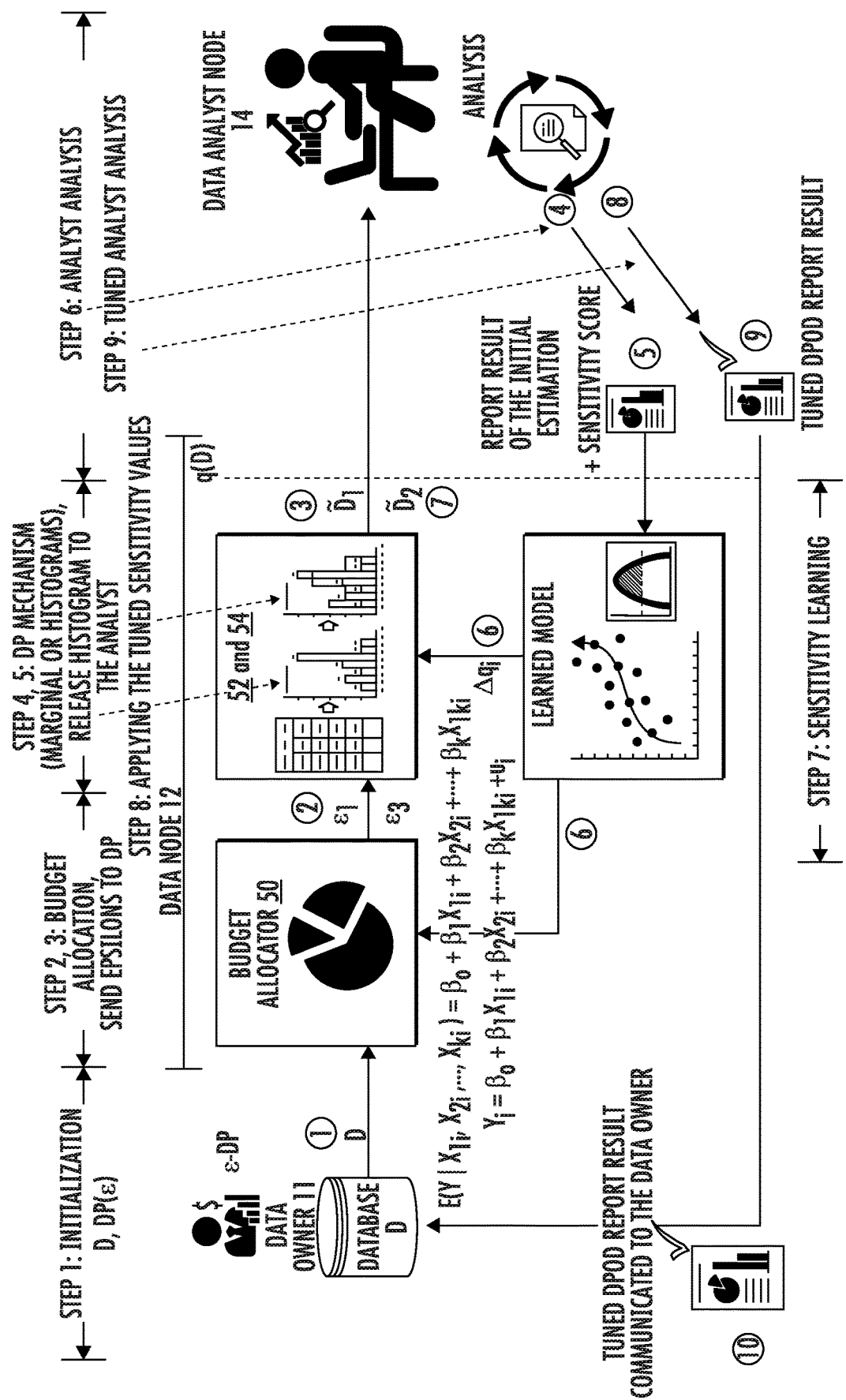
FIG. 11 is a block diagram of an example architecture of the system according to some embodiments of the present disclosure.

FIG. 11 is an architecture of the DPOD system 10 where several exchanged messages have been enumerated where the enumeration may be independent of the steps described herein as it may be meant to help with understanding the disclosure.

In particular, FIG. 11 includes data owner 11, data node 12 (DPOD manager entity 48, budget allocator 50, DP mechanism chooser 52 and DP histogram entity 54), data analyst node 14, etc.

The DPOD system 10 in FIG. 11 provide one or more of the following advantages:

1) The DPOD system 10 provides practical differentially private multi-domain anomaly detection. The problem of practicality has been raised in several existing works, e.g., while differential privacy provably obscures the presence or absence of individual records in a dataset, in some applications, such indistinguishability property of differential privacy is in direct contradiction with the analysis, e.g., in anomaly detection which requires differentiating between anomalous and normal records.
2) DPOD system 10 significantly improves the accuracy of the collaborative anomaly detection using a two-round communication between data owners and third-party analysts compared to existing systems.
3) The DPOD system 10 is instantiated based on the well-studied DP histogram publication which is a data type sufficient for outlier detection (compared with Small-DB which generates DP synthetic dataset but that may not be practical as it is exponential with respect to the size of the dataset). Other outsourcing DP mechanisms, e.g., smallDB, multiplicative gain, etc., which output more appropriate data types can also be used.
4) A realistic model of differentially private network trace analysis is described where a randomized sensitivity value may be assumed.
5) The DPOD system 10 is benchmarked under the Laplace mechanism for both network and credit card anomaly (fraudulent) detections.
6) The DPOD system 10 maintains all the operation processes from data owner side, which requires no effort from data owner's 11 side to get used and/or implemented the new system.

The detailed workflow for the DPOD system 10 (for a three-party computation) in FIG. 11 is as follows:

Stage 1:

Step 1. Data owners 1-3 ($DO_{1,2,3}$) (i.e., data owners 11) input respectively their Datasets $D_{1,2,3}$, with respectively privacy requirements $\epsilon_{1,2,3}$ based on their different parameters depending on their privacy requirements, such as, the type of data, the regulations for privacy protection, etc. In addition, they set the outsourcing sensitivity $\Delta q_0$ to be the global sensitivity of $D_{1,2,3}$ and while the available budget of at least one of the data owners 11 are positive, namely, $\epsilon_{1 \text{ or } 2 \text{ or } 3} > 0$, the following steps are repeated.

Step 2.1. Data node 12 computes outsourcing query sensitivity $\Delta q_{O,i}$ (an example solution to address this problem of sensitivity learning is known).

Step 2.2. Data node 12 computes the estimated query sensitivity $\Delta q_E$ (an example solution to address this problem of sensitivity learning is known).

Step 3. Data node 12 determines optimal budget $\epsilon_{1,2,3,0}$ for outsourcing of next round using Kelly criterion and update the available privacy budget of each of the data owners 11, for instance for party 1, $$\epsilon_{1=} \epsilon_1 - \frac{\Delta q_{O,i}}{\Delta q_{O,i-1}} \epsilon_{1,O}.$$

The Kelly criterion is known from literature.

Step 4. Data node 12 via DP Mechanism Chooser 52 provides a proper DP mechanism, i.e., selects a DP mechanism based at least on, for example, the epsilon value (e.g., $\epsilon_1$, $\epsilon_3$, etc.) as described herein. In this step, DP mechanism chooser 52 chooses a DP mechanism from various DP mechanisms, such as one of a Laplace mechanism, Gaussian mechanism, Exponential mechanism, DP histogram, etc. Each DP Mechanism corresponds to a noise pattern/profile that is configured to add noise to a dataset where the additional/higher noise applied to data leads to higher privacy for the data compared to a lower level of noise applied to data. For anomaly detection, a choice may be a DP histogram which is a low in complexity but effective mechanism in outsourcing differentially private data types to third party analysts.

Step 5. Data node 12 such as via the DP histogram entity 54 is configured to release the private histogram $\widetilde{H}_t$ (i.e., privatized dataset) that is based at least on the inputted DP mechanism, data set and the privacy budget (e.g., epsilon). A histogram is typically defined over a specific domain and a dataset where the histogram summarizes the occurrence counts of domain values over the dataset. For example, if the domain is a set of diseases D (such as cancer, flu, HIV, hepatitis, etc.), then a histogram over a patient dataset assigns the number of patients with a specific disease in the dataset.

The privatized histogram is then outsourced to the third-party outlier analyst such as to data analyst node 14.

Stage 2:

Step 6. Data analyst node 14, i.e., a semi-trusted third-party, managed security service provider (MSSP), etc., performs the anomaly identification using received privatized histograms received from data node 12 and generates/updates the semi-trusted third-party's set of anomalies for each of the data owners 11 ($R_{1,2,3}$). Data analyst node 14 may further cause transmission or report the results of the anomaly estimation.

The data analyst node 14 may further perform the sensitivity estimation (i.e., generates a new estimated sensitivity or sensitivity score). The new estimated sensitivity is then calculated to reduce privacy for the outliers (i.e., outlier data in the respective dataset) but keep the privacy same for the data records with normal behavior (i.e., data other than the outliers or non-outlier data) in the data set on step 1. That is, for each dataset, data analyst node 14 determines a new or proposed sensitivity value that may lead to the selection of a new noise profile for the dataset where noise added to the non-outlier data is kept the same and/or decreased compared to the previous or other noise profile while noise added to the outlier data is reduced compared to the previous or other noise profile.

The new estimated sensitivity may be sent to the data node 12 for the tuning.

Stage 3:

Step 7. Data node 12 updates its sensitivity value using the calculated anomaly scores of each record according to the data owner's privacy budget Epsilon3 at this stage. As an example way of performing this update, the data node 12 may use a sensitivity sampler to estimate a new value of the sensitivity according to the anomaly scores where the new sensitivity value may be used to select a new noise profile. In another example, data node 12 may update the sensitivity value to be used for a dataset based on the estimated sensitivity score calculated by the data analyst node 14.

Step 8. Next, the data node 12 applies DP according to the sensitivity value as defined/estimated, for example, in Step 7, such as to generate a tuned DP. The data node 12 sends the dataset with tuned DP to the data analyst node 14 for anomaly detection. In the multiple data owners 11 and multiple data set example in FIG. 11, each dataset may be separately "tuned" with a respective DP mechanism.

Stage 4:

Step 9. The data analyst node 14, i.e., a security management entity, performs the analysis on the dataset with the new/tuned DP which provides better privacy for normal data sets (i.e., non-outlier data) and less privacy for the outliers (i.e., outlier data) such as, for example, when compared to the previous untuned DP such as the DP selected in Step 4 or another DP mechanism. The data analyst node 14 may provide each of the data owners 11 with the security result (set of the anomalous records). As used herein in one or more embodiments, better privacy equates to adding more noise to certain data while less privacy equates to adding less noise or not adding noise to other data, when compared to a previous or other untuned DP or noise profile. Further, the process of FIG. 11 is equally applicable to the situation where there is only one data owner 11 or one dataset being processed in the first and second stages.

The Entities of DATA Node 12

DPOD Manager 48

DPOD manager 48 is the main communication channel and interface for the DPOD system 10. The DPOD manager 48 has one or more of the following functions:

Gather dataset from each data owner 11.

Gather the privacy constraint E from each data owner 11.

Communicate with third-party outlier analyst (data analyst node 14) to update the value of the sensitivity.

Pass all the constraints to budget allocation block.

Budget Allocator 50

Budget allocator 50 optimally divides the total DP budget of each data owner 11 into two smaller values to be spent in the two-round solution described herein. The budget allocator 50 has the following functions:

Gather input from DPOD manager 48.

Optimally divide the privacy budget into two smaller values using Kelly criterion (i.e., a known betting strategy) and based on the current and the predicted value of sensitivity.

Pass all the DP budgets to DP mechanism chooser 52.

The budget allocator 50 is at least one component/entity described herein that is not known in literature nor implemented in existing systems.

DP Mechanism Chooser 52

This component/entity receives the privacy budget of each round. Accordingly, the DP Mechanism Chooser 52 selects the mechanism to maximize the utility of a query that is provided by the data analyst node 14.

Example 1

For instance, if the budget is expressed in terms of ($\epsilon$, $\delta$) which is a weaker version of differential privacy, the DP mechanism chooser 52 may choose a Gaussian mechanism instead of Laplace mechanism since the Gaussian mechanism may perform better than the Laplace mechanism.

DP Histogram Entity 54

This component/entity, based on the received DP mechanism and privacy budget, releases a private histogram (e.g., privatized dataset). A histogram is typically defined over a specific domain and a dataset where the histogram summarizes the occurrence counts of domain values over the dataset. For example, if the domain is a set of diseases D (such as cancer, flu, HIV, hepatitis, etc.), then a histogram over a patient dataset assigns the number of patients with a specific disease in the dataset. The privatized histogram is then outsourced to the third-party outlier analyst (e.g., data analyst node 14).

Data Analyst Node 14 (Outlier Detection)

A curator such as the data analyst node 14 is assumed to be a trusted curator. The data analyst node 14 performs the anomaly identification using received privatized histograms from each data owner 11. Since the histogram data type is outsourced to the data analyst node 14 then an appropriate choice of anomaly detection algorithm is required, e.g., Histogram-based Outlier Score (HBOS). The data analyst node 14 also updates the value of the sensitivity based on the anomaly score of each record. The latter can also be performed remotely on the data owner sides using SMC to address any misuse from the analyst side.

Figure 12:
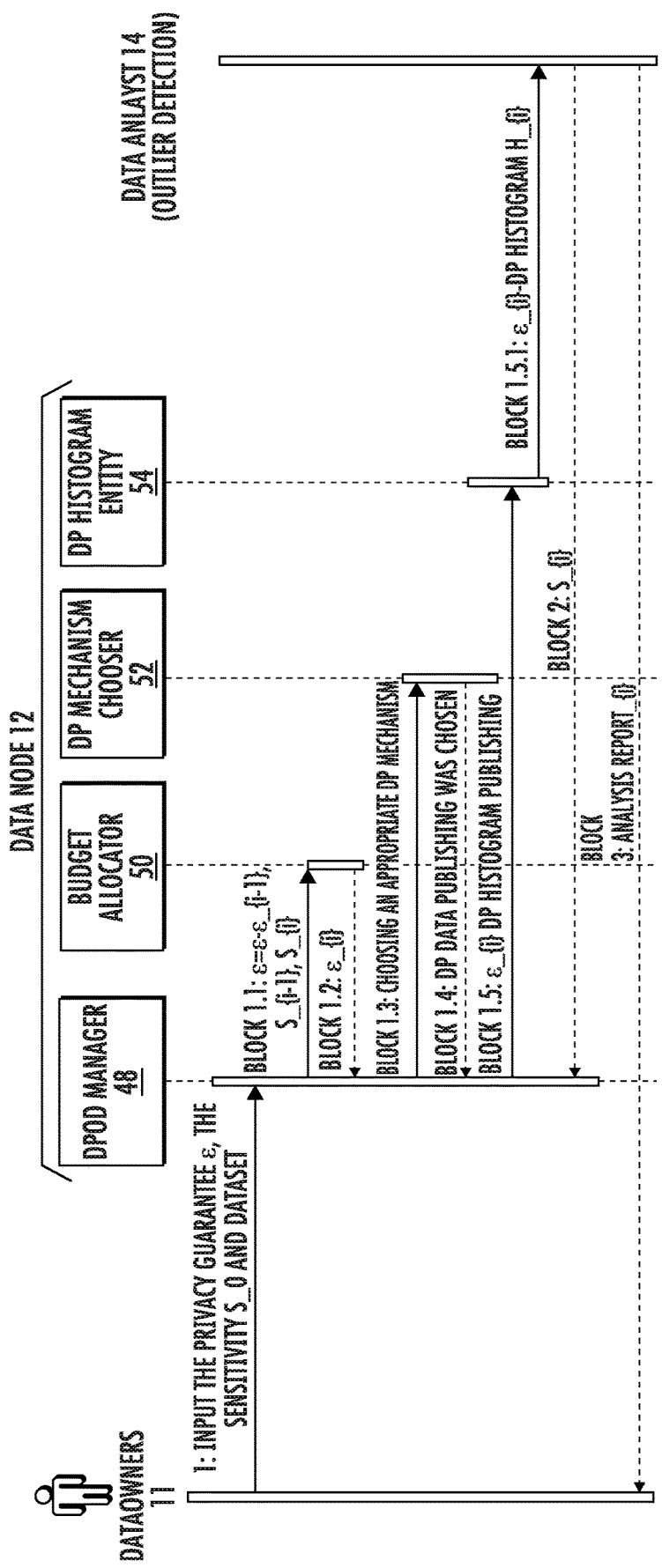
FIG. 12 is a sequence diagram according to some embodiments of the present disclosure.

FIG. 12 and Algorithm 1 (FIG. 13) further demonstrate one or more of the aforementioned steps where FIG. 12 is a sequence diagram of DPOD according to the principles of the disclosure, and FIG. 13 is an algorithm for DPOD according to the principles of the disclosure. The approach used for the estimated sensitivity portion of the algorithm may be a known solution for addressing the problem of sensitivity learning.

The DPOD manager entity 48 inputs/receives, from the data owners 11, the privacy guarantee $\epsilon$, the sensitivity $S\_0$ and dataset (Block 1). The budget allocator 50 inputs/receives $\epsilon = \epsilon - \epsilon_{(i-1)}$, $S_{(i-1)}$, $S\_\{i\}$ (Block 1.1). The budget allocator 50 transmits $\epsilon\{i\}$ to the DPOD manager 48 (Block 1.2). The DP mechanism chooser 52 select an appropriate DP mechanism (Block 1.3). The DP mechanism chooser 52 indicates to DPOD manager 48 that DP Data Publishing was chosen (Block 1.4). The DPOD manager 48 transmits "$\epsilon_{\{i\}}$, DP Histogram Publishing" to DP histogram Publishing entity (Block 1.5). DP Histogram Publishing transmits $\epsilon_{\{i\}}$-DP Histogram Publishing H_{i} to security management entity 14 for outlier detection (Block 1.5.1). The security management entity 14 then transmits $S\_\{i\}$ to the DPOD manager 48 (Block 2). Analysis report_{i} is transmitted to the data owners 11 from the data analyst node 14 (Block 3).

Figure 14:
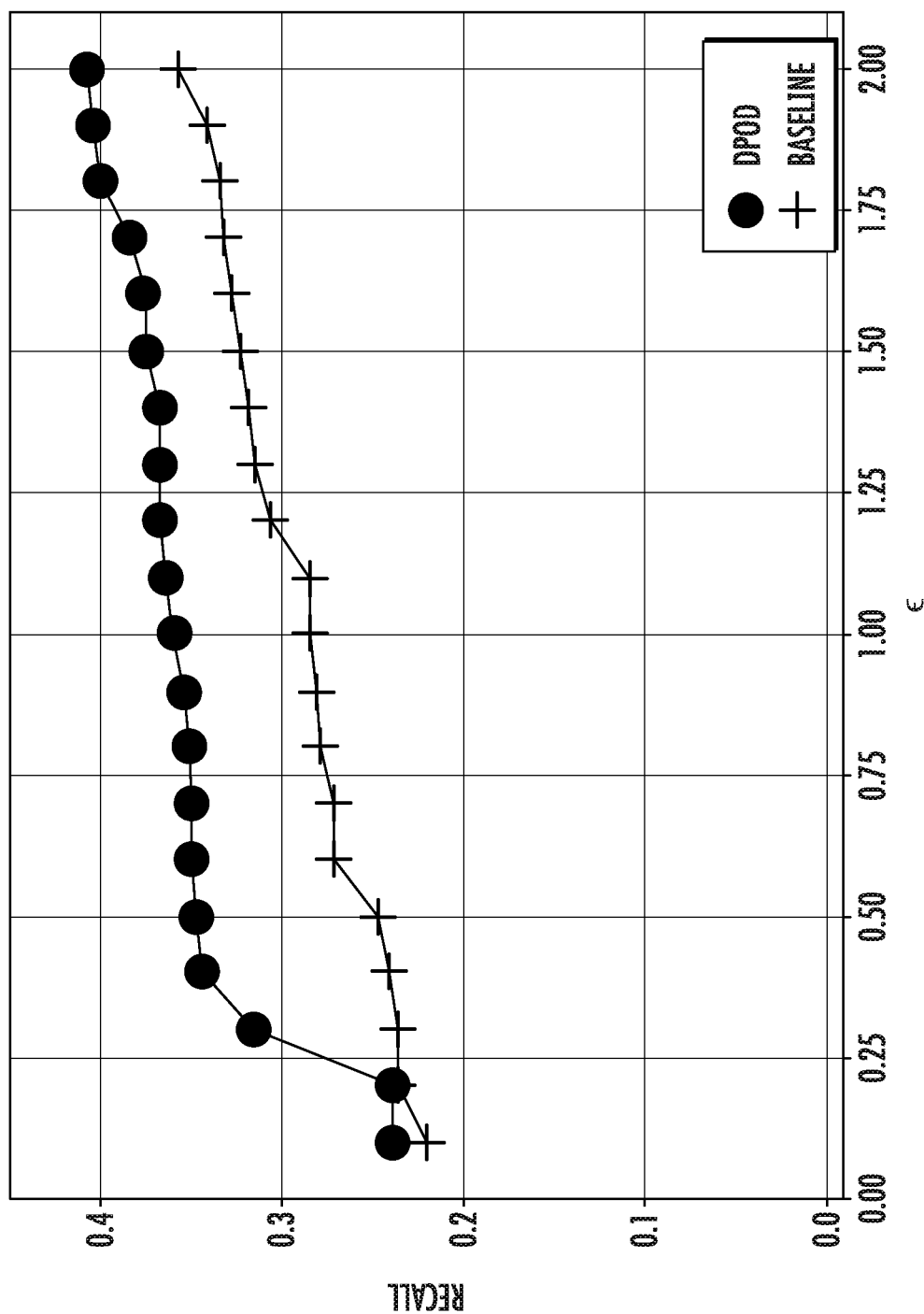
FIG. 14 is a diagram of an example benchmark of the DPOD algorithm.
Figure 15:
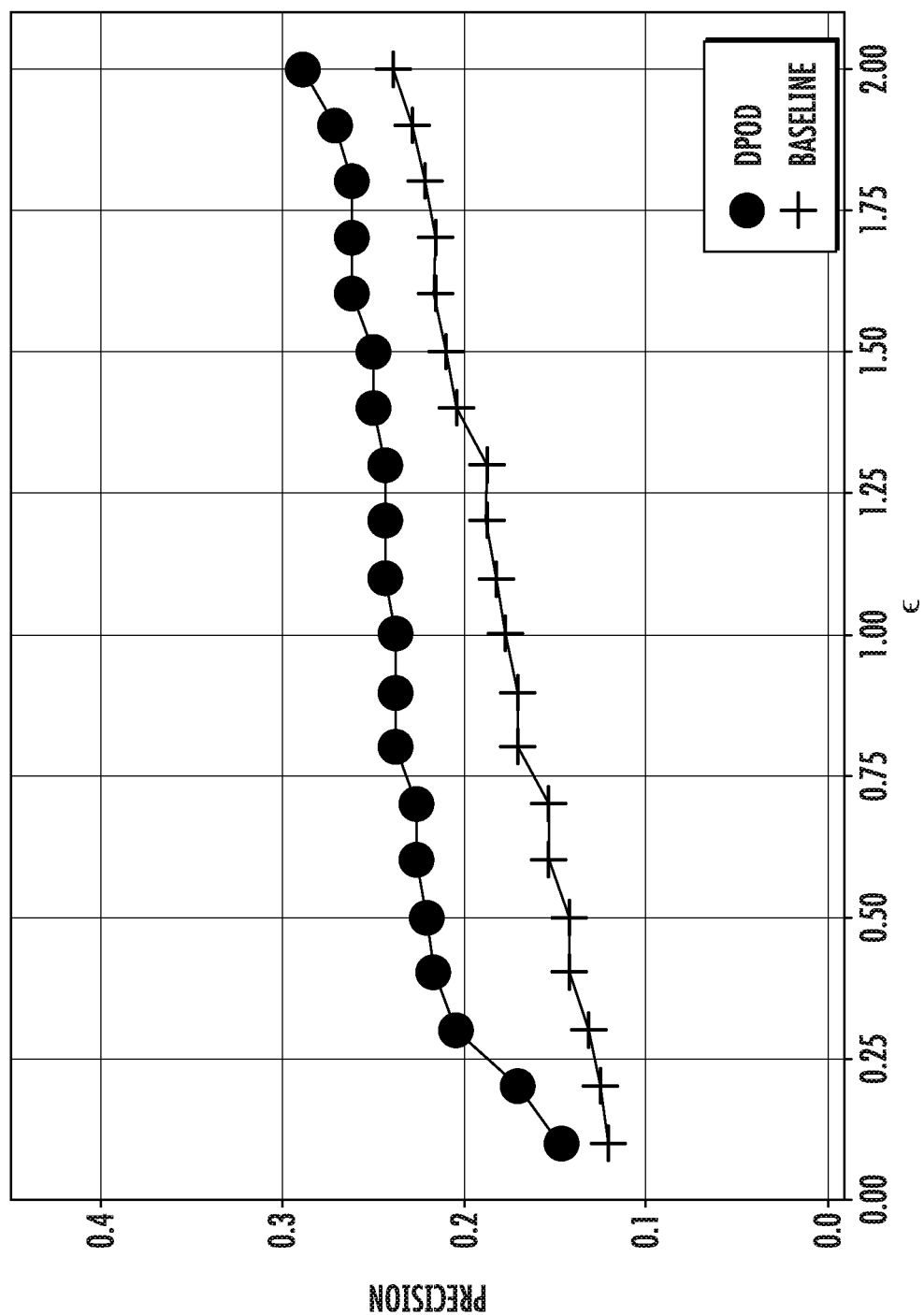
FIG. 15 is a diagram of another example benchmark of the DPOD algorithm.

The experimental results for the DPOD system is described below and illustrated in FIGS. 14-15.

The dataset used for the experiments:

Tcpdump tool is utilized to capture 100 GB of the raw traffic (e.g., Pcap files)

This data set has nine families of attacks, namely, Fuzzers, Analysis, Backdoors, DoS, Exploits, Generic, Reconnaissance, Shellcode and Worms.

In FIGS. 12-13, the performance in detecting the above attacks in the anonymized data set using anomaly detection (based on histogram) is compared with a baseline DP implementation, i.e., using a simple Laplace DP, for anonymization. The recall and precision for detecting the attacks in the data set using DPOD, as described herein, and without using DPOD (baseline) illustrate that DPOD allows better performances with higher precision and recall.

Several aspects and/or advantages of the disclosure are described below:

The solution/system described herein addresses the problem of privacy-preserving outsourcing of anomaly detection by decreasing the privacy of the anomalies through communication between the data owners 11 and the data analyst node 14, i.e., security management entity, to boost the accuracy of the analysis for the data with abnormal (i.e., outlier) behavior while preserving the privacy of the data with normal (i.e., non-outlier) behavior.

Referring back to the algorithm 1 of FIG. 13, the normal DP approach is based on the stages 1 and stages 4 (as described herein). In approach/solution described herein, two additional stages are added to the approach: stage 2 and stage 3 (as described herein), i.e., a first estimation and a tuning stages for the privacy budget. DPOD, as described herein, provides a collaborative anomaly detection system 10 between data owners 11, data node 12 and data analyst node 14. The system 10 is based on defining a total privacy budget which is divided according to some criterion (e.g., Kelly criterion) between stages 1 and 3. This budget allocation for the privacy budget is novel (performed in the stage 1). The system 10 receives the input from the data owners 11 and the data analyst node 14. Each data node 12 spends/uses a portion of the data owner 11's privacy budget to build a first estimation of the sensitivity. Each data analyst node 14 provides data node 12 with an updated sensitivity value using the calculated anomaly scores of each record.

The system 10 provides a new entity referred to as budget allocator 50 (e.g., privacy budget allocator) to build a DP for the queries. The budget allocation performed by the budget allocator 50 that optimally divides the total DP privacy budget of each data owner 11 into two values to be spent in two stages (stages 1 and 3) as described herein. As an example approach, the optimal values can be calculated using Kelly criterion (i.e., a betting strategy), for example. The concept of privacy budget being divided between stages 1 and 3 provides better tuned privacy and is a concept that is not described in existing literature nor implemented in existing systems.

The framework can be used in settings with one or more number of data owners 11 where each data owner 11 is associated with at least one respective dataset. In particular, the functions performed by data analyst node 14 may be dependent or independent of multiple datasets received by data analyst node 14 as the process for analyzing one or more datasets remains unchanged. In other words, the epsilon value that is used for the second iteration (round) to change the DP mechanism may calculated separate for each dataset such that the epsilon value depends only on the analysis of each data set, which could be different from the epsilon value calculated for one or more other datasets.

The DPOD system 10 is benchmarked under DP-Histogram publishing which illustrated improvement in performances over a baseline DP implementation.

The DPOD system 10 provides the optimal privacy budget to be spent on each of the rounds using a creative betting strategy model called Kelly criterion.

The general concept of randomized sensitivity in the DPOD system 10 can be adapted to improve a variety of other applications related to differential privacy when multi-access as used in contrast to single access datasets, e.g., URL data and set-valued data.

Some Examples

Example A1. A data node 12 configured to communicate with a security management entity (i.e., data analyst node 14), the data node 12 configured to, and/or comprising processing circuitry 40 configured to:

modify a sensitivity value for outlier data of a first dataset while maintaining the sensitivity value for non-outlier data of the first data set; and transmit a second dataset for anomaly detection where the second data set is based at least on the modified sensitivity value for the outlier data of the first dataset.

Example A2. The data node 12 of Example A1, wherein the processing circuitry 40 is further configured to generate the second dataset by applying a differential privacy based function using the modified sensitivity value.

Example B1. A method implemented by a data node 12 that is configured to communicate with a security management entity (i.e., data node 12), the method comprising:

modifying a sensitivity value for outlier data of a first dataset while maintaining the sensitivity value for non-outlier data of the first dataset; and transmitting a second dataset for anomaly detection where the second data set is based at least on the modified sensitivity value for the outlier data of the first dataset.

Example B2. The method of Example B1, further comprising generating the second dataset by applying a differential privacy based function using the modified sensitivity value.

Example C1. A security management entity (i.e., data analyst node 14) configured to communicate with a data node 12, the security management entity configured to, and/or comprising processing circuitry 28 configured to:

perform sensitivity estimation for modifying a sensitivity value for outlier data of a first dataset while maintaining the sensitivity value for non-outlier data of the first dataset;
receive a second dataset associated with a modified sensitivity value that is based at least on the sensitivity estimation of the first dataset; and detect an anomaly in a second dataset.

Example C2. The security management entity of Example C1, wherein the performing of the sensitivity estimation includes:
scoring each data point in the first dataset with a respective anomaly score; and
identifying outliers in the first dataset based on the scoring of each data point.

Example D1. A method implemented by a security management entity (i.e., data analyst node 14) that is configured to communicate with a data node 12, the method comprising:
performing sensitivity estimation for modifying a sensitivity value for outlier data of a first dataset while maintaining the sensitivity value for non-outlier data of the first dataset;
receiving a second dataset associated with a modified sensitivity value that is based at least on the sensitivity estimation of the first dataset; and detecting an anomaly in a second dataset.

Example D2. The method of Example D1, wherein the performing of the sensitivity estimation includes:
scoring each data point in the first dataset with a respective anomaly score; and
identifying outliers in the first dataset based on the scoring of each data point.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A data node configured to communicate with a data analyzer node and a plurality of data owners, the data node comprising processing circuitry configured to:

receive from each data owner of the plurality of data owners, a dataset having a respective privacy requirement and a sensitivity;

apply to each dataset a respective one of a plurality of first noise profiles, each first noise profile configured to add noise to a respective dataset according to the respective privacy requirements of the dataset to provide a plurality of first privatized datasets;

release the plurality of first privatized data sets to the data analyzer node;

receive from the data analyzer node an anomaly estimation for each first privatized dataset, the anomaly estimation being indicative of outlier data in a respective first privatized dataset;

update the respective sensitivity for each first privatized dataset based at least in part on the anomaly estimations;

apply a second noise profile configured to reduce noise of outlier data of each first privatized dataset to generate respective second privatized datasets, the second noise profile being selected based at least in part on the respective updated sensitivity.

2. The data node of claim 1, wherein the processing circuitry is further configured to determine an updated sensitivity value for the dataset based at least on the anomaly estimation and a privacy budget.

3. The data node of claim 1, wherein a received dataset includes outlier data and non-outlier data, the second noise profile being configured to reduce noise applied to outlier data when compared to a noise applied to outlier data by the first noise profile.

4. The data node of claim 1, wherein a received dataset includes outlier data and non-outlier data, the second noise profile being configured to increase noise applied to non-outlier data when compared to noise applied to the non-outlier data by the first noise profile.

5. The data node of claim 1, where the processing circuitry is further configured to apply the first noise profile to outlier data in a received dataset; and applying the second noise profile to a first privatized dataset to generate the second privatized dataset includes applying the second noise profile to non-outlier data in the dataset.

6. The data node of claim 1, wherein the anomaly estimation indicates an anomaly score for a respective privatized dataset.

7. The data node of claim 1, wherein the processing circuitry is further configured to receive a sensitivity estimation that is based on the first privatized dataset, the sensitivity estimation indicating whether to modify the first noise profile, the second noise profile being further based at least on the sensitivity estimation.

8. The data node of claim 7, wherein the sensitivity estimation indicates to reduce privacy for outlier data of the dataset while at least maintaining privacy for non-outlier data of the dataset.

9. The data node of claim 1, wherein a first noise profile provides a first data sensitivity value for a first privatized dataset; and the second noise profile provides a second data sensitivity value for the second privatized dataset, the second data sensitivity value being different from the first data sensitivity value.

10. The data node of claim 1, wherein respective noise profiles of the plurality of first noise profiles each correspond to a respective differential privacy mechanism configured to quantify a privacy level provided to data of the respective received dataset.

11. The data node of claim 1, wherein a first privatized dataset is a first privatized histogram of the respective received dataset and the second privatized dataset is a second privatized histogram of the first privatized dataset.

12. A data analyst node configured to communicate with a data node, the data analyst node comprising processing circuitry configured to:

receive from the data node a plurality of first privatized data sets, each first privatized data set being based on application of a respective first noise profile of a plurality of noise profiles configured to add noise to a respective dataset received by the data node from a different data owner of a plurality of data owners, each received respective dataset having a respective privacy requirement and a sensitivity;

determine an anomaly estimation for each first privatized dataset, the anomaly estimation being indicative of outlier data in a respective first privatized dataset;

transmit to the data node the anomaly estimation for a first privatized dataset;

receive a second privatized dataset, the second privatized dataset being based on application of a second noise profile configured to reduce noise of outlier data of a first privatized dataset based at least in part on an updated sensitivity for the first privatized database, the second noise profile being based at least on the anomaly estimation; and perform anomaly estimation for the second privatized dataset.

13. The data analyst node of claim 12, wherein a received first privatized dataset includes outlier data and non-outlier data, the second noise profile being configured to reduce noise applied to outlier data when compared to a noise applied to outlier data by the first noise profile.

14. The data analyst node of claim 12, wherein a received first privatized dataset includes outlier data and non-outlier data, the second noise profile being configured to increase noise applied to non-outlier data when compared to noise applied to the non-outlier data by the first noise profile.

15. The data analyst node of claim 12, wherein the anomaly estimation indicates an anomaly score for a respective privatized dataset.

16. The data analyst node of claim 12, wherein a respective first noise profile provides a first data sensitivity value for a respective first privatized dataset; and the second noise profile provides a second data sensitivity value for the second privatized dataset, the second data sensitivity value being different from the first data sensitivity value.

17. The data analyst node of claim 12, wherein the processing circuitry is further configured to determine a sensitivity estimation that is based on a first privatized dataset, the sensitivity estimation indicating whether to modify the respective first noise profile, the second noise profile being further based at least on the sensitivity estimation.

18. The data analyst node of claim 12, wherein the sensitivity estimation indicates to reduce privacy for outlier data of the dataset while at least maintaining privacy for non-outlier data of the dataset.

19. The data analyst node of claim 12, wherein the processing circuitry is further configured to cause transmission of the anomaly estimation for the second privatized dataset.

20. The data analyst node of claim 12, wherein a first privatized dataset is a first privatized histogram of the first privatized dataset and the second privatized dataset is a second privatized histogram of the dataset.

21. A method implemented by a data node configured to communicate with a data analyzer node and a plurality of data owners, the method comprising:
   receiving from each data owner of the plurality of data owners, a dataset having a respective privacy requirement and a sensitivity;
   applying to each dataset a respective one of a plurality of first noise profiles, each first noise profile configured to add noise to a respective dataset according to the respective privacy requirements of the dataset to provide a plurality of first privatized datasets;
   releasing the plurality of first privatized data sets to the data analyzer node;
   receiving from the data analyzer node an anomaly estimation for each first privatized dataset, the anomaly estimation being indicative of outlier data in a respective first privatized dataset;
   updating the respective sensitivity for each first privatized dataset based at least in part on the anomaly estimations;
   applying a second noise profile to the configured to reduce noise of outlier data of each first privatized dataset to generate respective second privatized datasets, the second noise profile being selected based at least in part on respective updated sensitivity.

22. The method of claim 21, further comprising determining an updated sensitivity value for the dataset based at least on the anomaly estimation and privacy.

23. The method of claim 21, wherein a received dataset includes outlier data and non-outlier data, the second noise profile being configured to reduce noise applied to outlier data when compared to a noise applied to outlier data by the first noise profile.

24. The method of claim 21, wherein a received dataset includes outlier data and non-outlier data, the second noise profile being configured to increase noise applied to non-outlier data when compared to noise applied to the non-outlier data by the first noise profile.

25. The method of claim 21, further comprising applying the first noise profile to outlier data in a received dataset; and
   applying of the second noise profile to a first privatized dataset to generate the second privatized dataset includes applying the second noise profile to non-outlier data in the dataset.

26. The method of claim 21, wherein the anomaly estimation indicates an anomaly score for a respective privatized dataset.

27. The method of claim 21, further comprising receiving a sensitivity estimation that is based on a first privatized dataset, the sensitivity estimation indicating whether to modify a first noise profile, the second noise profile being further based at least on the sensitivity estimation.

28. The method of claim 27, wherein the sensitivity estimation indicates to reduce privacy for outlier data of a second privatized dataset while at least maintaining privacy for non-outlier data of the dataset.

29. The method of claim 21, wherein a first noise profile provides a first data sensitivity value for a first privatized dataset; and
   the second noise profile provides a second data sensitivity value for the second privatized dataset, the second data sensitivity value being different from the first data sensitivity value.

30. The method of claim 21, wherein the respective noise profiles of the plurality of first noise profiles each correspond to a respective differential privacy mechanism configured to quantify a privacy level provided to data of the respective received dataset.

31. The method of claim 21, wherein a first privatized dataset is a first privatized histogram of the respective received dataset and the second privatized dataset is a second privatized histogram of the first privatized dataset.

32. A method implemented by a data analyst node configured to communicate with a data node, the method comprising:
   receiving from the data node a plurality of first privatized data sets, each first privatized data set being based on application of a respective first noise profile of a plurality of noise profiles configured to add noise to a respective dataset received by the data node from a different data owner of a plurality of data owners, each received respective dataset having a respective privacy requirement and a sensitivity;
   determining an anomaly estimation for each first privatized dataset, the anomaly estimation being indicative of outlier data in a respective first privatized dataset;
   transmit the anomaly estimation for a first privatized dataset;
   receiving a second privatized dataset the second privatized dataset being based on application of a second noise profile configured to reduce noise of outlier data of a first privatized dataset based at least in part on an updated sensitivity for the first privatized database, the second noise profile being based at least on the anomaly estimation; and
   performing anomaly estimation for the second privatized dataset.

33. The method of claim 32, wherein a received first privatized dataset includes outlier data and non-outlier data, the second noise profile being configured to reduce noise applied to outlier data when compared to a noise applied to outlier data by the first noise profile.

34. The method of claim 32, wherein a received first privatized dataset includes outlier data and non-outlier data, the second noise profile being configured to increase noise applied to non-outlier data when compared to noise applied to the non-outlier data by the first noise profile.

35. The method of claim 32, wherein the anomaly estimation indicates an anomaly score for a respective privatized dataset.

36. The method of claim 32, wherein a respective first noise profile provides a first data sensitivity value for a respective first privatized dataset; and
   the second noise profile provides a second data sensitivity value for the second privatized dataset, the second data sensitivity value being different from the first data sensitivity value.

37. The method of claim 32, further comprising determining a sensitivity estimation that is based on a first privatized dataset, the sensitivity estimation indicating whether to modify the respective first noise profile, the second noise profile being further based at least on the sensitivity estimation.

38. The method of claim 32, wherein the sensitivity estimation indicates to reduce privacy for outlier data of the second privatized dataset while at least maintaining privacy for non-outlier data of the second privatized dataset.

39. The method of claim 32, further comprising causing transmission of the anomaly estimation for the second privatized dataset.

40. The method of claim 32, wherein a first privatized dataset is a first privatized histogram of the first privatized dataset and the second privatized dataset is a second privatized histogram of the dataset.

* * * * *